United States Patent [19]

Birdsall et al.

[11] 4,272,187
[45] Jun. 9, 1981

[54] AUTOMATIC ALIGNMENT OF OPTICAL ELEMENTS IN AN ELECTROPHOTOGRAPHIC APPARATUS

[75] Inventors: Ivan P. Birdsall, Boulder; Paul J. Bradmon, Longmont; Donald L. Buddington, Boulder; Vincent H. Garcia, Berthoud; Don S. Nelson, Arvada, all of Colo.

[73] Assignee: International Business Machines Corporation, Armonk, N.Y.

[21] Appl. No.: 104,255

[22] Filed: Dec. 17, 1979

[51] Int. Cl.³ .................... G03B 27/34; G03B 27/40
[52] U.S. Cl. .................................. 355/56; 250/201; 352/140; 354/25; 355/3 R
[58] Field of Search ............... 354/25, 31, 60 E, 60 L; 355/55, 56, 3 R; 250/201, 202, 203 CT; 358/128; 356/4; 350/163 SF; 352/140

[56] References Cited

U.S. PATENT DOCUMENTS

| | | | |
|---|---|---|---|
| 3,295,010 | 12/1966 | Clayton | 315/11 |
| 3,510,219 | 5/1970 | Liva | 355/55 |
| 3,593,286 | 7/1971 | Altman | 340/146.3 |
| 3,623,790 | 11/1971 | Buckstad | 355/55 X |
| 3,652,158 | 3/1972 | Burgess | 355/91 |
| 3,662,662 | 5/1972 | Dewan | 354/25 |
| 3,691,922 | 9/1972 | König et al. | 354/25 |
| 3,698,808 | 10/1972 | Delmas | 355/45 |
| 3,836,252 | 9/1974 | Touchette et al. | 355/100 |
| 3,875,401 | 4/1975 | Stauffer | 250/201 |
| 3,897,148 | 7/1975 | Ritchie | 355/57 |
| 3,938,894 | 2/1976 | Nanba | 356/125 |
| 3,970,842 | 7/1976 | Nanba et al. | 250/201 |
| 4,005,443 | 1/1977 | Albrecht | 354/25 |
| 4,005,940 | 2/1977 | Kidd et al. | 356/172 |
| 4,007,326 | 2/1977 | Bernsen | 358/280 |
| 4,047,187 | 9/1977 | Mashimo et al. | 354/25 X |
| 4,048,492 | 9/1977 | Hartmann | 250/201 |
| 4,053,929 | 10/1977 | Collins et al. | 250/203 CT X |
| 4,078,171 | 3/1978 | Stauffer | 250/201 |
| 4,104,517 | 8/1978 | Mesch et al. | 250/204 |
| 4,133,606 | 1/1979 | Hosoe et al. | 354/25 |
| 4,209,241 | 6/1980 | Nanba et al. | 354/25 |

OTHER PUBLICATIONS

IBM Technical Disclosure Bulletin, "Automatic CCTV Positioning System," R. F. Duffy, B. M. Eisenstadt and S. I. Petvai, 1/72, pp. 2348–2350.

IBM Technical Disclosure Bulletin, "Automatic Semiconductor Positioning System Using an Image Dissector," B. M. Eisenstadt, 4/72, pp. 3367–3369.

IBM Technical Disclosure Bulletin, "Automatic Semiconductor Positioning System," B. M. Eisenstadt and S. I. Petvai, 4/72, pp. 3370–3371.

IBM Technical Disclosure Bulletin, "Optical Surface Microtopography Measurement and/or Automatic Focussing," A. Frosch, M. Kallmeyer, H. Korth and F. Schedewie, 7/72, pp. 504–505.

IBM Technical Disclosure Bulletin, "Computer-Aided, Operator-Insensitive, Optical Alignment," M. K. Bullock, 4/79, pp. 4376–4377.

IBM Technical Disclosure Bulletin, "Focus Detector," B. Drollinger and H. Korth, 12/79, pp. 2784–2785.

*Primary Examiner*—Richard A. Wintercorn
*Attorney, Agent, or Firm*—Gunter A. Hauptman

[57] ABSTRACT

The optical elements of a copier are automatically aligned by positioning the elements under the control of signals from an image-dissecting scanner. The scanner, mounted to receive the image normally presented to the photoconductor, examines a master document placed in the position normally occupied by a document to be copied. Optical adjustments are made as a function of the examination of lines on the master document by the scanner. The contrast between a line and its background is maximum when optical elements between the master document and the scanner provide the sharpest focus of the line image to the scanner. Signals from the scanner for a plurality of lines on the master document determine optimum positioning of the optical elements. The scanner determines the apparent spacing between lines, which are a known distance apart on the master document, to position the optical elements for a desired magnification. The positions of selected lines, examined by the scanner, relative to absolute reference points are used to align the master document support for subsequent copying of original documents.

28 Claims, 15 Drawing Figures

PROCESSOR 29

MOTION INTERFACE (26) OUTPUT
(1 of 9)

MOTION INTERFACE (26) INPUT
(1 of 9)

SCAN SUBROUTINE

AUTOMATIC ALIGNMENT OF OPTICAL ELEMENTS IN AN ELECTROPHOTOGRAPHIC APPARATUS

BACKGROUND OF THE INVENTION

1. Field of the Invention

The invention relates to an electrophotographic apparatus and, more particularly, to the automatic alignment of optical elements therein.

2. Description of the Prior Art

An electrophotographic apparatus, for example a copier using xerographic principles, focuses an illuminated image of an original document on a photoconductive surface. The surface is selectively charged and discharged in accordance with the image. Copies of the original result from the transfer of a developing material from this surface to the copy medium. A basic determinant of copy quality is therefore the accuracy of the image focus. Since the image is usually scanned onto the photoconductor by a moving reflector, another important factor in copy quality is the accuracy of the relationships among the scanning elements. Copiers often permit the copy to be smaller than the original, an affect obtained by optical manipulation. The accuracy of this manipulation will have a significant affect on copy quality. A document glass is normally used to position the original document. The placement of index marks on the glass relative to the image ultimately formed on the photoconductor surface significantly affects copy quality.

Assuming that the above factors affecting copy quality can be accurately adjusted and aligned initially, with time, the copy quality will, nevertheless deteriorate due to mechanical wear, slippage, stretching and the like.

It is therefore, evident that an accurate initial adjustment and alignment technique is essential to the manufacture of a high-quality copier and that if this technique is simple, the same technique will be useful in maintaining the operation of a copier.

Typically, adjustment of lenses, lights, carriages, fiber-optic bundles, reflectors, mirrors, document glasses, etc. has been performed manually by skilled technicians. For example, the photoconductor surface may be replaced with a temporary screen for viewing the image during adjustment. The technician then adjusts the copier elements for the best apparent focus. Depending upon the complexity of the copier, the "best" focus may occur for different adjustments depending upon, for example, what part of the original document is scanned or whether the copy is being reduced. Among the problems with this approach is the difficulty of imitating the actual copier operation (such as scanning), the requirement that a "best" focus be selected from among several possible best foci, reliance upon the tecnician's subjective evaluation of focus and the normal human failings resulting from fatigue and inattention. In addition, this approach is slow and gives inconsistent, as well as inaccurate, results. As the copier gets smaller and more complex, it becomes ever more difficult to quickly make the accurate adjustments necessary for an economically manufacturable copier.

The prior art discloses some attempts to minimize the manual steps involved in adjusting and aligning copiers. In U.S. Pat. No. 3,510,219, a variety of manual adjustments are facilitated by providing a leveling device for the document glass, a universally adjustable lens mounting, and the like. It is also known to place a television camera in a position which permits the technician to conveniently view the image essentially as it would appear on the photoconductor surface. Accuracy of adjustment and alignment has also been increased by substituting, during manufacture, a narrow beam of coherent light for the light source normally used during copying. None of these approaches eliminates all the manual steps and, therefore, to some extent, they all share the shortcomings inherent in humans.

Partially automated focusing and alignment systems are known in the prior art. In U.S. Pat. No. 3,623,790, a servo loop maintains a constant spacing between a lens and a film plane to both guarantee focus and avoid contact with the film. In U.S. Pat. No. 4,007,326, an electrical analog of a copy image is compared with an electrical analog of an original image. The copy and the original are adjusted until a comparison circuit connected to a television monitor causes the television images to cancel—indicating correct focus. U.S. Pat. No. 3,662,662 uses two optical systems to illuminate two photo cells. If one optical system is adjusted identically to the other (reference) system, both cells will be equally illuminated—indicating correct focus. All the foregoing require either human judgment, duplicate optics or rigidly-fixed adjustment parameters.

Attempts have been made to completely remove the subjective human element from the determination of focus. In U.S. Pat. No. 3,691,922, the point of sharpest focus occurs when a photocell detects a predetermined brightness/darkness distribution. In U.S. Pat. No. 3,593,286, an electronic image dissector tube is used to electronically scan an optical image and store electrical signals of the image for subsequently establishing similarities or changes between successive images. An electronic light sensor mechanically scans an image to determine the point of best focus in the Focatron Model P-122 marketed by Logetronics, Inc., Alexandria, Virginia. In the foregoing, changes in light distribution are analyzed and the plane of sharpest image is recognized when the largest number of target objects are recognized. An ITT Model F4100 Vidissector camera tube used in ITT Model F5019 camera unit marketed by the ITT Aerospace/Otpical Division, Fort Wayne, Indiana, electronically scans an image and supplies signals indicative of image light levels. A suggested procedure for determining the sharpest vidissector camera focus includes the step of monitoring the video output for maximum white level and dark level response. In an IBM TECHNICAL DISCLOSURE BULLETIN article published July, 1972, pages 504–505, focusing is automatically adjusted as a function of a comparison between the widths of photocurrent pulses from light detectors.

SUMMARY OF THE INVENTION

Optimum adjustment of the optical elements in a copier is automatically obtained, without involving subjective judgments regarding sharpness of focus, for an entire image plane and for more than one degree of magnification. The actual image at the image plane (the photoconductor in a xerographic copier, paper in an ink-jet copier) is used for optical adjustment and alignment without placing any physical restrictions on copier optical design and without introducing complex mechanical elements. The adjustment process utilizes existing drive elements and an additional electronically controlled image scanner. Thus, the optical elements may be adjusted and fixed in position, as a unit, before final assembly of the copier.

In general, the invention examines the image of an illuminated target, locates target lines and scans one line at a time repeatedly while adjusting optical parameters and recording the scan position and numbers representing the light levels (which indicate apparent focus values of the scanned target line for each adjustment). The position of the lowest light levels (indicating the best focus values) of all the scanned lines are averaged and the optical parameters are readjusted to this "best" overall focus. If different magnification ratios are provided in the copier, for image reduction, the adjustments for "best" focus are then tested for each magnification ratio, and appropriate adjustments are made to ensure that the same focus sharpness is obtained for all magnification ratios. Also, if desired, the invention permits alignment of the document retainer, which carries the target, with a predetermined desired document retainer target position.

More particularly, the invention automatically adjusts and aligns a copier's optical system during manufacture and prior to normal use. The position on the document glass normally occupied by an original document is filled by a master document carrying an alignment target of specially placed lines. The target is illuminated by the copier's normal light source operated in its normal manner. For example, in a scanning light system, a bar of light scans the target. At the position normally occupied by the photoconductor is placed an image dissector electronic scanning camera connected to control circuits. The control circuits control electronic scanning of areas on the target, receive information from the camera identifying the locations scanned, and control drive motors which reposition the camera to different target areas and adjust various elements of the copier's optical system.

In operation, the camera is positioned to a target area having a line. A scan is made until the line position is located and, then, repeated scans of the line location are made while the optical system is adjusted in steps through various degrees of focus. Light level is measured during each line location scan. The line position is initially identified by a drop in light level from a predetermined function of the measured light level. Then, this predetermined function of the measured light level is stored for subsequent best focus determination. The controls record the light level detected by the camera for different focus adjustments, during each line scan; the lower the light level, the sharper the focus during each scan. The best line focus is determined by comparing light levels, measured while repeatedly scanning a line, with a function of the previously detected light levels. The lowest light level, less than the previous light levels, is the focus value of the line.

The operation is repeated for a number of preselected target areas, each containing a line. Subsequently, the quantity, for each line, representing the sharpest focus for that line may be selected and a statistical "best" overall focus for the entire target selected. The optical system is then readjusted and fixed in the "best" focus position. If the copier provides for variable magnification, such as copy-size reduction, the "best" optical system is moved to its other magnifications and adjusted until, for each position, the "best" focus is attained. The variable magnification elements are then also fixed in position. If desired, the document glass can be aligned with the optics by moving it to bring the previously recorded target line positions into register with line positions also stored by the controls.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1A:
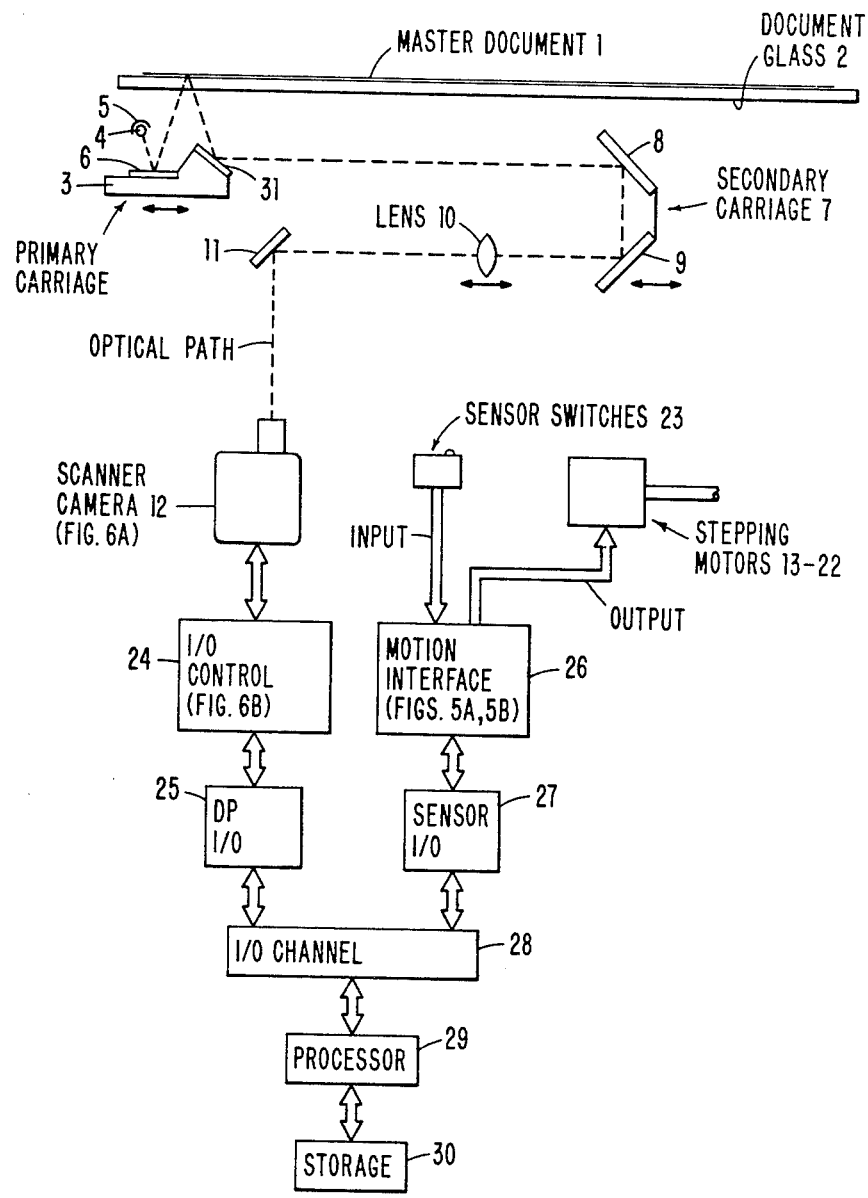
FIG. 1A is a schematic representation of a copier incorporating the invention.
Figure 1B:
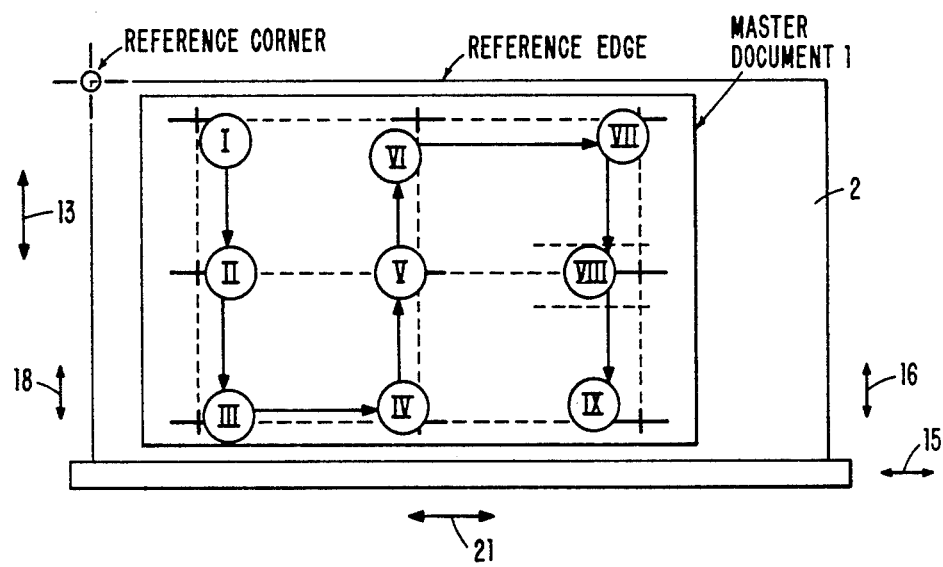
FIG. 1B is a plan view of the master document of FIG. 1A.
Figure 6C:
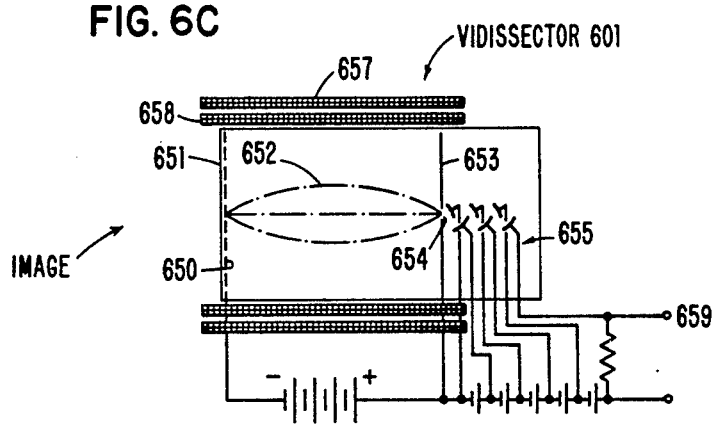
FIG. 6C is a cross-sectional schematic view of an image dissector tube.
Figure 6D:
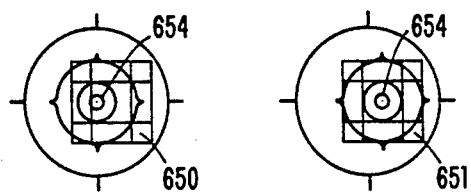
FIG. 6D is a diagram illustrating an image on the tube of FIG. 6C.

General Description—FIGS. 1A and 1B

Referring first to FIG. 1A, there is shown a master document 1 mounted on a document glass 2 carrying lines in juxtaposition with the document glass so that light may pass through the document glass 2 to the lines on the master document 1 which may be a transparent, translucent or opaque sheet. A movable primary carriage 3 carries a light source 4 which emits light reflected from a reflector 5 and a mirror 6 onto the master document 1 as the primary carriage moves in the direction shown. The light is reflected from the master document to another mirror 31 carried on the primary carriage 3 and then to mirrors 8 and 9 on a secondary carriage 7 movable in the directions shown. The light reflected from the mirror 9 passes through a lens 10 and then is reflected from a mirror 11 which is in fixed relationship to a scanner camera 12. The scanner camera 12 is capable of scanning an image of an area on the master document 1 made available to its optical input as a result of the light scanned onto the master document from the lamp 4. The limited area made available to the scanner 12 is "dissected" by the electronic circuitry associated with the scanner 12 and digitized so that, at an electronic output from the scanner 12, there is available digital data representing light values sequentially scanned by the scanner camera 12 in the area determined by the light 4.

Stepping motors 13-22 are provided to move the document glass, the carriages 3 and 7, the lens 10 and the scanner camera 12. Sensor switches 23 are provided at various points to sense the limits of motion of the mechanical elements associated with the system. The stepping motors 13-22 and the sensor switches 23 interact to provide predetermined areas of examination to the scanner camera 12 so that digital data is available indicating light values on areas of the master document 1 necessary to operation of the invention.

The digital data available from the scanner camera 12 is interpreted by input/output controls 24 and 25 which are connected via an input/output channel 28 to a processor 29 having a storage 30. Signals essential for the scanner camera 12 to operate in accordance with the necessary scanning commands are provided to the input/output control 24 from the processor 29 in accordance with a logical sequence partially recorded in the storage 30. The necessary movements of the master document 1 and the associated optical elements, for example primary carriage 3, secondary carriage 7 and lens 10, are accomplished by commands from the processor transferred to the stepping motors 13-22 by way of sensor input/output circuits 27 and motion interface circuits 26.

The general configuration and operation of the apparatus incorporating the invention will be understood by reference to FIG. 1B, which is a plan view of the master document 1, illustrating the areas I-IX made available to the scanner camera 12 for scanning operations. Areas I-IX are arranged into columns (for example I, VI, VII) and rows (for example I, II, III). The master document 1 is illustrated as mounted on the document glass 2 which is viewed from the side from which light is scanned. The scanning camera 12 is moved in desired directions by stepping motors to position different columns of the document 1 relative to the camera 12. A primary carriage 3 is moved by a motor 21 to position different rows on the document 1 relative to the camera 12. As the motors 13 and 21 are stepped, they move the primary carriage 3 and the scanner camera 12 to the camera 12 selected areas I-IX on the master document 1 one at a time. A reference edge and a reference corner are provided for the document glass 2 to initialize its position and provide reference information for proper alignment. Initially, area I is brought into the imaging area of the scanner camera 12. When operations are completed in the area I, motor 13 causes the scanner camera 12 to move to bring area II into its field of operation. Similarly, motor 13 causes field III to be examined by the camera 12. Movement from area III to area IV is accomplished by moving the primary carriage 3 via motor 21. Subsequently, areas V and VI are reached by movement of the camera 12 by motor 13. Area VII is reached by moving the primary carriage 3, and areas VIII and IX are reached by movement of the camera 12.

Still referring to FIG. 1B, there are provided on the master document 1 a number of lines which fall within the areas I-IX. For example, a line (column), shown dashed for illustration, falls within the area I. When the area I is made available to the camera 12, the camera 12 electronically scans area I until the vertical line is found. The position, that is the coordinates, of the point at which the line was found is recorded as digital data by the processor 29. Prior to finding the line, the light values of the background, that is the non-line area, of the master document 1 are also recorded by the processor 29. Once the vertical line in the area I is found, the line itself is repeatedly scanned and the light values for each scan are recorded by the processor 29. The optical elements, for example secondary carriage 7, are adjusted for each scan so that the light values recorded by the processor 29 will be a function of the position of the optical elements. Utilizing the observation that the line will appear to be darker when it is in focus than when it is not in focus, the light values recorded will be indicative of the apparent degree of focus of the vertical line in the area I for each different optical element position. The processor 29 will monitor the light values, attempting to identify any light value that is less than the previous light value. Thus, there will be recorded, for each line, a light value that indicates "improved" focus. That is, improving focus causes the line to apear to get darker relative to the previously recorded background. When light values increase (get brighter), the optical element adjustments may either be causing the system to leave the point of "best focus" or there may be a temporary perturbation in the system. The condition involved is identified by continuing to take readings during subsequent scans and adjustments of the lens system. If the light values continue increasing thereafter, it is assumed that the point of best focus has been passed, and the value recorded for that point is then used. However, if the light values again decrease, it is assumed that there was a temporary perturbation and the lower values continue to be recorded as before until there again is an increase in light values. In this way, a value is recorded for the "darkest" light value of the vertical line in the area I during repeated adjustment of the optical elements. The adjustments of the optical elements are also recorded so that when operations within the area I are completed, there is recorded, as a minimum, the position of the vertical line and the adjustments of the optical system which gave the "best" focus for that vertical line.

When the scanner camera 12 is moved by the motor 13 to examine the area II, another line is examined, as shown, in exactly in the same manner as just described. Similarly, lines in areas III-IX are examined and the positions of the lines are recorded, as are the adjustments of the optical system to obtain the darkest, that is "best focus", for each line. The positions of the optical elements for the best focus at each of the nine areas I-IX are then averaged together to give the optical adjustment for an optimum focus. It will be noted that this optimum focus adjustment is not necessarily the same as the "best focus" for any one of the nine areas. However, as an alternative, statistical techniques may be used to identify a statistically "best focus" which may be superior to the average.

Once the position of the optical elements for the optimum focus is determined, the optical elements, for example carriage 7, are moved to that position and necessary physical adjustments are made to ensure that they will be fixed in that position during normal operation.

The camera 12 is then moved by motor 13 back to area VIII where there are two additional lines spaced a known distance apart. The area VIII is again scanned; this time, however, while looking for the two lines in turn. When one of the lines is found, its coordinates are recorded and the second line is searched for. When the second line is found, its coordinates (representing the apparent spacing of the two lines) are recorded. The difference between the coordinates, calculated by the processor 29, is a function of the magnification of the optical system and is adjustable by moving the lens 10. The processor 29 supplies signals necessary to step motor 17 the necessary amount to adjust the magnification of the optical system to bring the apparent spacing between the lines in the area VIII to the amount necessary for a predetermined amount of magnification.

The motor 13 then steps the camera to area VII to again bring the upper line into the image area of the camera 12. The area VII is used a second time, in conjunction with area I, to ensure that the document glass 2 is properly aligned. This is accomplished by finding the top line in area VII and recording its position. Then the primary carriage 3 is moved by motor 21 to bring the top line in area I into the camera 12 image area. The camera 12 scans for the top line and records its position when found. The difference between the coordinates of the top line in area VII and area I is an indication of the skew, or lack of alignment, of the document glass 2. The skew is corrected by rotating a reference edge about a reference corner under the control of motors 15, 16 and 18 until the coordinates of the horizontal line as detected in areas VII and I are identical.

Figure 2:
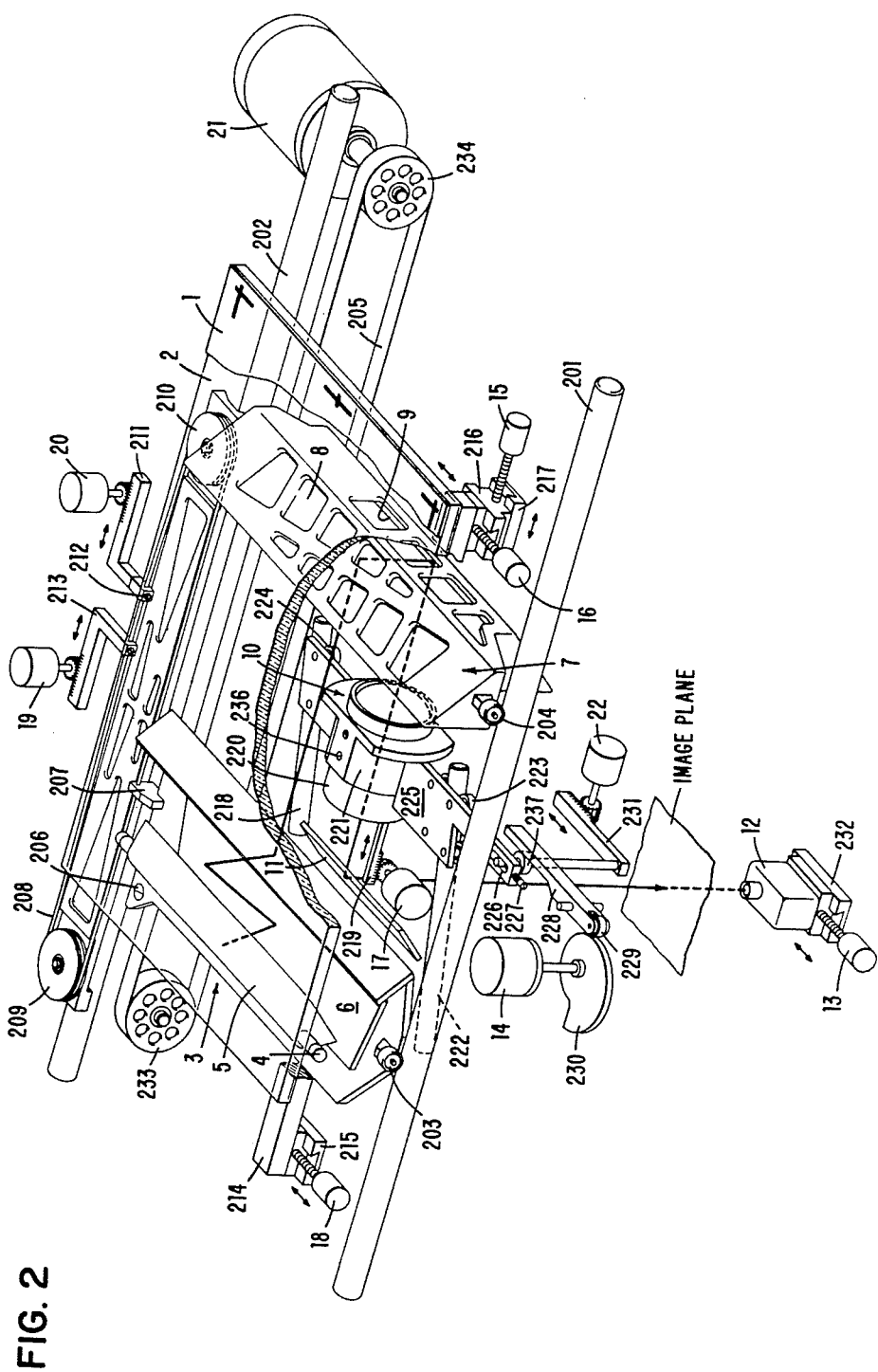
FIG. 2 is a three-dimensional view of the copier optical system.
Figure 3:
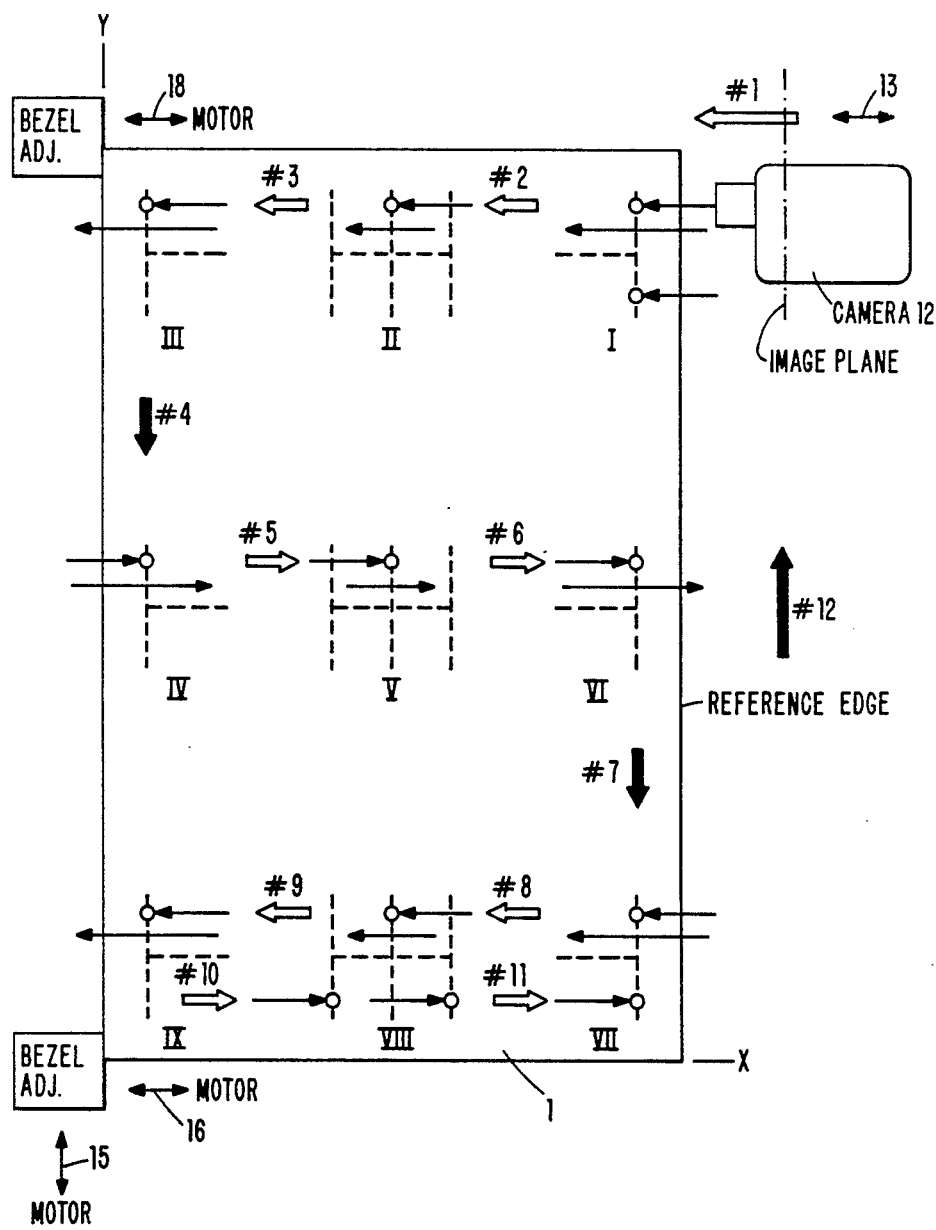
FIG. 3 illustrates scanning of a test pattern on a master document.

Optical System—FIGS. 2 and 3

Referring now to FIG. 2, an optical system for an electrophotographic apparatus, herein called a "copier", such as a copier, information distributor, facsimile terminal, printer, etc., is shown. The purpose of the system is to scan a "footprint" of light from the lamp 4 across a document, for example a test pattern 1, placed on the document glass 2. In equivalent systems (for example flash, laser, etc. illumination), the scanning technique is replaced by other illumination devices or by direct deposition (such as ink jet). In the particular optical system shown, the image may be reduced in accordance with the setting of the lens assembly 10, but image enlargement is alternatively possible. For purposes of achieving proper initial adjustment of the optical system during the manufacturing process, several additional elements are provided, and several additional adjustments which are fixed in normal operation are available for manual adjustment. Most important, the normal position of the photoconductor (in a plain-paper copier—in a coated-paper copier, a non-photoconductive paper support surface is the equivalent) is replaced with the scanner camera 12 focused on the image plane normally occupied by the photoconductor surface. Once the optical elements are adjusted to an optimum series of settings, as seen by the scanner camera 12, replacement of the scanner camera 12 by an optical photoconductor at the image plane examined by the scanner camera 12 will give optimum operation of the electrophotographic apparatus. The particular adjustments made in the apparatus of FIG. 2 are those necessary to achieve the sharpest focus at the image plane, to place the relative positions of the optical elements in a position for a desired amount of reduction and to align the document glass 2 in accordance with a predetermined set of reference axes.

In FIG. 2, there is provided a set of rails 201 and 202 carrying carriages 3 and 7 which are movable on the rails by rotation of wheels 203 and 204. A scan drive strap 205 is placed over pulleys 233 and 234 to drive, under control of scan stepper motor 21, the primary carriage 3. The primary carriage 3 is fastened to the scan drive strap 205 by a fastener 206, and there is additionally provided a clamp 207 which is attached to scan drive cable 208 threaded around pulleys 209 and 210. Thus, when the scan stepper motor 21 drives the primary carriage 3 by means of the scan drive strap 205, motion is also imparted to the scan drive cable 208. The secondary carriage 7 is attached to the frame 235 which carries the pulleys 209 and 210. If the scan drive cable 208 is fixed in position, for example to a bar 211 at setscrew point 212, then the secondary carriage 7 will move as the primary carriage 3 moves. The rate of motion of the secondary carriage 7 relative to the primary carriage 3 is 1:2. A normal relationship is provided whereby the secondary carriage 7 moves relative to a fixed reference, half the distance that the primary carriage 3 moves, relative to the same fixed reference. The offset of the primary carriage to the secondary carriage, that is the initial spacing at their closest or most distant position, is a function of where point 212 is attached to cable 208. This point is changed in normal operation by moving arm 211 under the control of reduction drive stepper 20. However, during adjustment operations, the set point is not fixed; that is, the setscrew 212 is loose permitting the scan drive cable 208 to slide freely without moving the arm 211. A resolution stepper 19 is temporarily provided to change the fixed position of the scan drive cable by moving the point of connection in accordance with the position of the arm 213. Once a desired relationship between the primary carriage 3 and the secondary carriage 7 is determined, by adjustment of the resolution stepper 19, the setscrew 212 is fixed in position and the resolution stepper 19 is disconnected. It can, therefore, be seen that adjustment of the optical elements can be easily achieved by stepping the resolution stepper motor 19.

The magnification, that is reduction capability, of the optical system can be changed by adjustment of the position of the reduction drive stepper 20 and also requires adjustment of the position of the lens assembly 10. The adjustment of the lens assembly 10 is achieved by moving the lens assembly 10 on rails 218 and 222 under the control of reduction drive motor 14. The reduction drive motor 14 rotates a cam 230 which causes a cam follower 229 to move an arm 228 which, in turn, moves the entire lens assembly 10 by causing plate 225 to slide on the rails 218 and 222 via wheels 223 and 224. The relative position of the lens assembly 10 may be adjusted by sliding the lens 220 inside its barrel 221 in accordance with signals to a magnification motor 17 which drives an arm 219. Once the desired position of the lens assembly 10 is achieved, setscrews 236 must be tightened to fix the lens 220 in the lens barrel 221. Further magnification, that is reduction, adjustments are made by controlling the position of the plate 225 relative to the cam 230. This is achieved by joint operation of the slot 226 and a setscrew 227 provided on the plate 225. A reduction adjustment stepper motor 22 moves arm 231 to place the shaft of the follower wheel 237 in the slot 226 at the desired position. The setscrew 227 is then brought to that point to fix the relationship of the cam 230 and the plate 225. Both the reduction adjustment stepper motor 22 and the magnification motor 17 are provided for purposes of adjustment only.

The document glass 2 is fastened to a bezel clamp 214 which may be positioned, and thus position the document glass, under the control of document glass stepper motors 15, 16 and 18. The stepper motors 15 and 16 emit the control of document glass 2 in two axes. The document glass stepper 15 causes the document glass 2 and also the document glass stepper motor 16 to move relative to a fixed reference as the document glass stepper motor causes a sliding in block 217. Block 216 moves in accordance with operation of document glass stepper 15, and, thus, motion in a direction 90° from the direction caused by document glass stepper 15 is caused by operation of document glass stepper 16. Document glass stepper 18 causes motion of the bezel clamp 214 in one direction as the document glass stepper motor 18 causes sliding in block 215.

Referring now to FIG. 3, the patterns on the master document 1 mounted on the document glass are shown in more detail, together with the relative physical motions involved by driving the motors 13-22 shown in FIG. 2. FIG. 2 shows the camera 12 focused on, and movable in, the image plane (that is, without changing its position relative to the image plane, by motor 13). The document glass 2 is movable by bezel adjustment stepping motors 15, 16 and 18, movable in the directions shown by the arrows. The master document 1 is divided into three rows, each having three columns. The areas defined by the rows and columns are designated as areas I-IX, numbered in the sequence in which they are examined. The camera is moved by motor 13 to access areas in its row; that is, areas I, II, III are accessed by movement of the camera 12. It is necessary to move at least the carriage 3 under the control of scan stepper motor 21 to bring another row of areas to the camera 12. For example, it is necessary to bring areas IV, V and VI into the view of the camera 12 before the camera 12 can access those areas by movement under the control of motor 13. In FIG. 2, motion of the camera under control of the motor 13 is shown by a white arrow, and motion of the carriages 3 and 7 under control of the motor 21 is shown by a dark arrow. The arrows are numbered: #1, #2, #3, #4, #5, #6, #7, #8, #9, #10, #11, #12 to indicate twelve sequential steps of accessing areas I-IX. For example, in step #1, the camera 12 is driven by the camera motor 13 to access area I. Then, in step #2, the camera 12 is driven by the motor 13 to area II. In step #3, the camera 12 is driven to area III, and in step #4, the carriage 3 is stepped by the motor 21 to bring a new row of areas IV, V and VI into the field of the camera 12. Each area of the master document 1 is examined by electronically scanning the camera 12 for a specified indicia. As is shown in FIG. 2, there are provided a number of lines, illustratively shown as dashed lines, on the master document 1. Depending upon the step of operation, the camera 12 will examine different aspects of the lines. For example, when area I is examined initially, the vertical line is first located, and once it is found, it is scanned twenty-one times for twenty-one different optical element adjustments. Similar operations occur in areas II-IX. Once the last line in area IX is scanned, the tenth step takes the camera 12 back to area VIII where two vertical lines instead of one are located for purposes of determining magnification. Then, in step #11 and #12, the two segments of the vertical line in areas VII and I are reexamined to determine the difference between the coordinates of their positions for aligning the document glass 2 until the coordinates are substantially the same. The following table summarizes the operations performed upon the master document 1 as shown in FIG. 3:

| Step # | Drive Motor | Area No. | Operation |
| --- | --- | --- | --- |
| 1 | Camera 13 | I | Find and Scan |
| 2 | Camera 13 | II | Find and Scan |
| 3 | Camera 13 | III | Find and Scan |
| 4 | Carriage 21 | IV | Find and Scan |
| 5 | Camera 13 | V | Find and Scan |
| 6 | Camera 13 | VI | Find and Scan |
| 7 | Carriage 21 | VII | Find and Scan |

-continued

| Step # | Drive Motor | Area No. | Operation |
| --- | --- | --- | --- |
| 8 | Camera 13 | VIII | Find and Scan |
| 9 | Camera 13 | IX | Find and Scan |
| 10 | Camera 13 | VIII | Find and Find |
| 11 | Camera 13 | VII | Find |
| 12 | Carriage 21 | I | Find |

Figure 4:
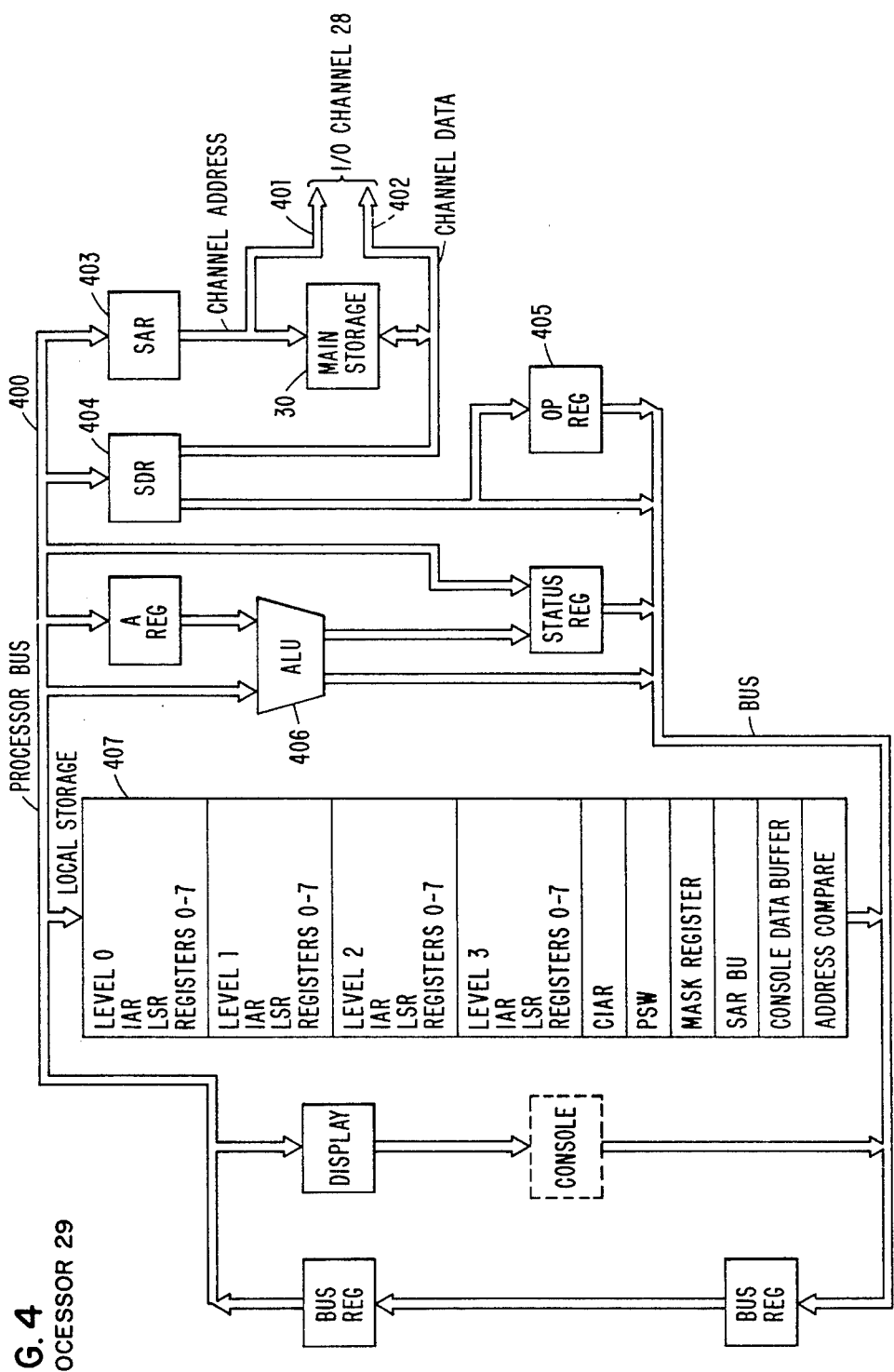
FIG. 4 is a block diagram of a minicomputer.

Control Circuits—FIGS. 4 and 5

Referring now to FIG. 4, there is shown a generalized block diagram of a commercially available processor which may be utilized as the processor 29 in FIG. 1A. The particular processor utilized has associated with it input/output channel and storage circuits 28 and 30 and special circuits for dealing with electrical signals from external sources. For purposes of illustration, FIG. 4 shows a processor 29 marketed by the International Business Machines Corporation as the IBM Series/1, Model 3, 4953 Processor. It will be understood that a detailed description of this processor is not necessary because the information is generally available. A description of the 4953 Processor is found in a publication entitled "4953 Processor Description", Form No. GA34-0022-2, Third Edition, dated November, 1977, and published by the International Business Machines Corporation. It will be understood that other processors may be substituted for the processor disclosed herein without affecting the operation of the invention. Another processor usable in the invention is disclosed in U.S. Pat. No. 4,086,658, filed Oct. 4, 1976, by D. E. Finlay, assigned to the International Business Machines Corporation.

Central to the processor 29 shown in FIG. 4 is a processor bus 400 to which are connected all the operational registers and other elements necessary to the operation of a processor. Information is transferred to and from external sources via an input/output channel 28 connected to the processor 29 by a channel address bus 401 and a channel data bus 402. The storage 30 is attached to the channel buses 401 and 402 in the embodiment shown. The information in the form of digital data representations supplied to the input/output channel is placed on the channel address and channel data buses 401 and 402 and placed into storage and operated upon by the processor 29 in accordance with programs of instructions stored in the main storage 30 and interpreted by facilities in the processor 29. Similarly, results of operations within the processor 29 are transferred to the input/output channel 28 via the address and data buses 401 and 402 under the control of programs of instructions stored in the main storage 30. Locations in the main storage 30 are addressed by digital representations of storage addresses placed into the storage address register 403. The data at the locations specified by the storage address register 403 is placed in storage data register 404. When the data in the storage data register 404 represents instruction information, as opposed to data, the instructions are interpreted by circuitry connected to the operation register 405. Data is manipulated in an arithmetic and logic unit 406 in accordance with the interpreted instructions. a local storage 407 is provided for a large number of specialized registers, counters, and control devices. Additional registers and facilities are utilized within the processor 29 to enable the transfer of information on the buses 401 and 402 in accordance with operations specified by programs of instructions in the main storage 30. An assembly language listing of a program of instructions for configuring the control circuits to operate in accordance with the invention is incorporated herein. The comments included in the listing are self-explanatory.

Figure 5A:
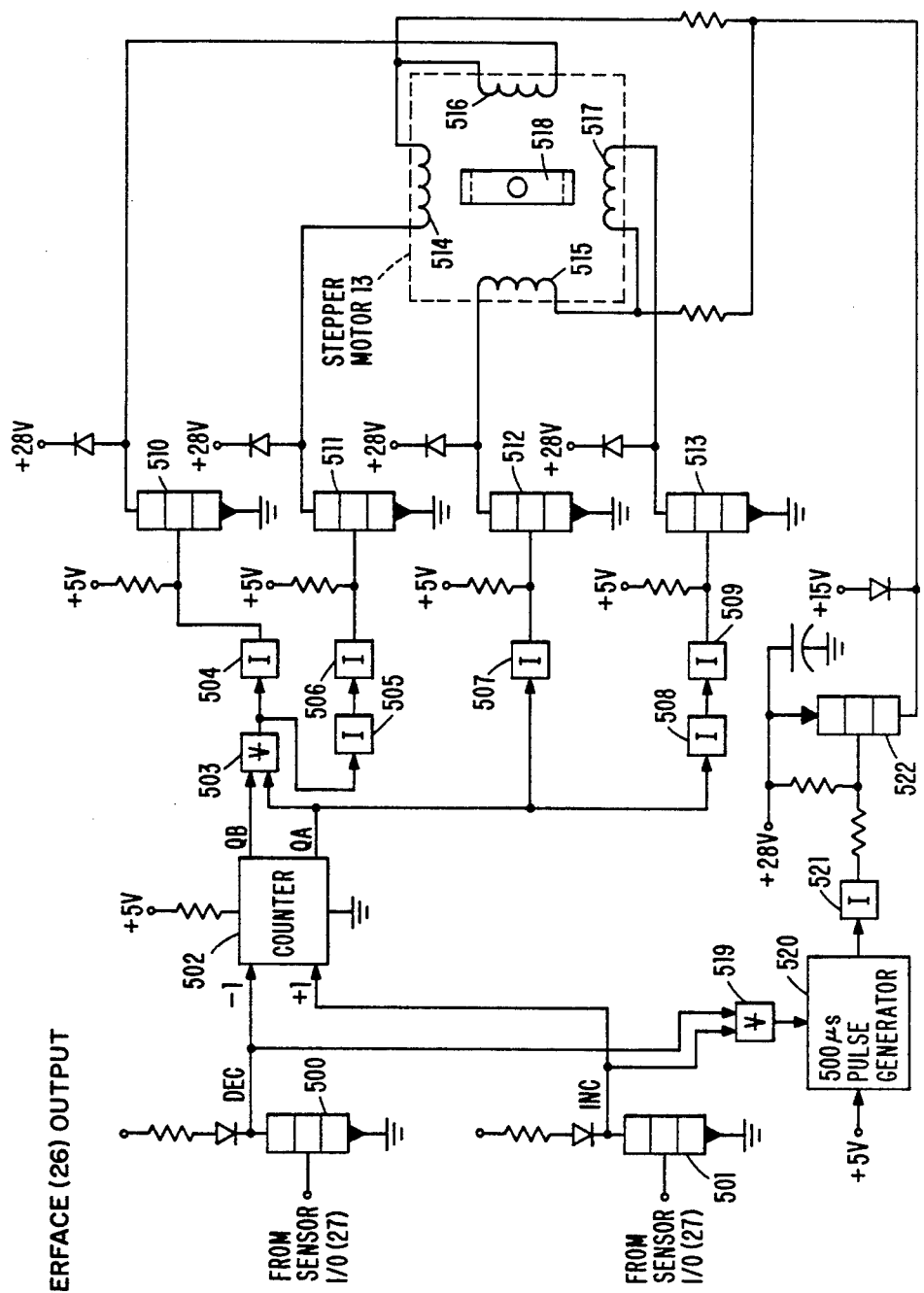
FIG. 5A is a schematic diagram of a minicomputer output circuit for driving a motor.

Operations involving external devices, such as the operation of stepper motors and the sensing of signals from switches, are performed by sensor input/output circuits normally associated with the processor 29 and described in a publication entitled "IBM Series/1 4982 Sensor Input/Output Unit Description", Form No. GA34-0027-2, Third Edition, dated June, 1978, published by International Business Machines Corporation. Referring to FIG. 5A, there is shown a circuit for interconnecting digital data representations from the sensor input/output circuits 27 to the stepper motors 13–22. For purposes of economy, the operation of only one stepper motor 13 is illustrated in FIG. 5A. One series of digital signals from the sensor input/output circuit 27 is used to decrement, that is step downward, the stepper motor 13, and another set of digital representations is used to increment, that is step in the other direction, the stepper motor 13. The decrement and increment signals from the sensor input/output circuit 27 are supplied through drive transistors 500 and 501 to a counter 502. The counter 502 may be stepped in either direction, but the exclusive OR circuit 503 guarantees that there will be a signal to drive transistors 510–513 only if it is stepped in one direction and not if it is stepped simultaneously in both directions. The counter 502 outputs QA and QB are inverse outputs, and together with inverters 504, 509 provide signals to the field coils 514–517 of stepper motor 13 necessary to rotate the rotor 518 one increment in one direction for each digital pulse from sensor input/output 27 placed into transistor 500 and in the other direction for every digital representation entering transistor 501. The incrementing is accomplished by utilizing transistors 510–513 to appropriately switch the coils 514–517 in anticipation of an increment pulse received from the pulse generator 520 when a signal is received at either of the counter 502 inputs. The pulse generator 520 supplies a five hundred microsecond pulse through an inverter 521 and drive transistor 522 to appropriately step the stepper motor 13, rotor 518.

Figure 5B:
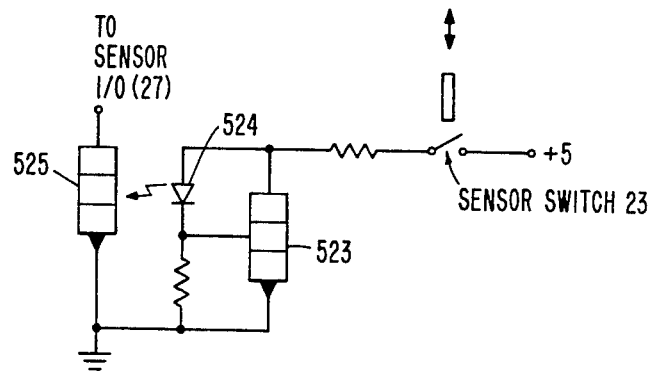
FIG. 5B is a schematic diagram of a minicomputer input circuit operated by a switch.

Referring to FIG. 5B, an example of the connection of a sensor switch 23 to the sensor input/output circuit 27 is illustrated. The purpose of the circuit shown in FIG. 5B is to isolate the circuits in the sensor input/output 27 from the potential source +5 when the sensor switch 23 is closed. This is accomplished by illuminating the light emitting diode 524 connected across the transistor 523 to activate the transistor 525 when transistor 525 detects the occurrence of light from the emitter 524. The transistor 525 is light sensitive.

Camera Circuits—FIGS. 6A–6D

Referring now to FIGS. 6A–6D, an input/output control 24 and scanner camera 12 usable with the invention will be described. The camera is an ITT Model F5019 camera utilizing an ITT Model F4100 vidissector camera tube. The camera tube is mounted in the camera which is, in turn, connected to an input/output control which is operable to control the scanning of areas viewed by the camera tube and to supply, at an output connected to an input/output channel 28 by way of a data processing input/output connection 25, signals indicating the coordinates of the positions scanned and digital data representing the light value of the points scanned. The vidissector tube is a camera tube receiving an image on a photosensitive cathode which is scanned in accordance with magnetic fields to place the apparent image at different positions on a fixed scanning aperture. As shown in more detail in FIG. 6C, an image entering the vidissector tube 601 appears in a plane 650 on one side of a translucent photosensitive cathode 651. Deflection coils 657 and 658 control the position of the image from the cathode 651 to the aperture 654 such that only the desired point of that image is projected through the aperture 654. The aperture 654 has a fixed opening across which is scanned the entire image, one point at a time. The amount of light on the aperture 654 determines the magnitude of the electron beam impinging through the aperture at the time a particular point is scanned. Electron multiplier elements 655 amplify the signal to supply at an output 659 at the anode 653 a series of electrical pulses representing the light values at sequentially scanned points on the image 650.

Figure 6A:
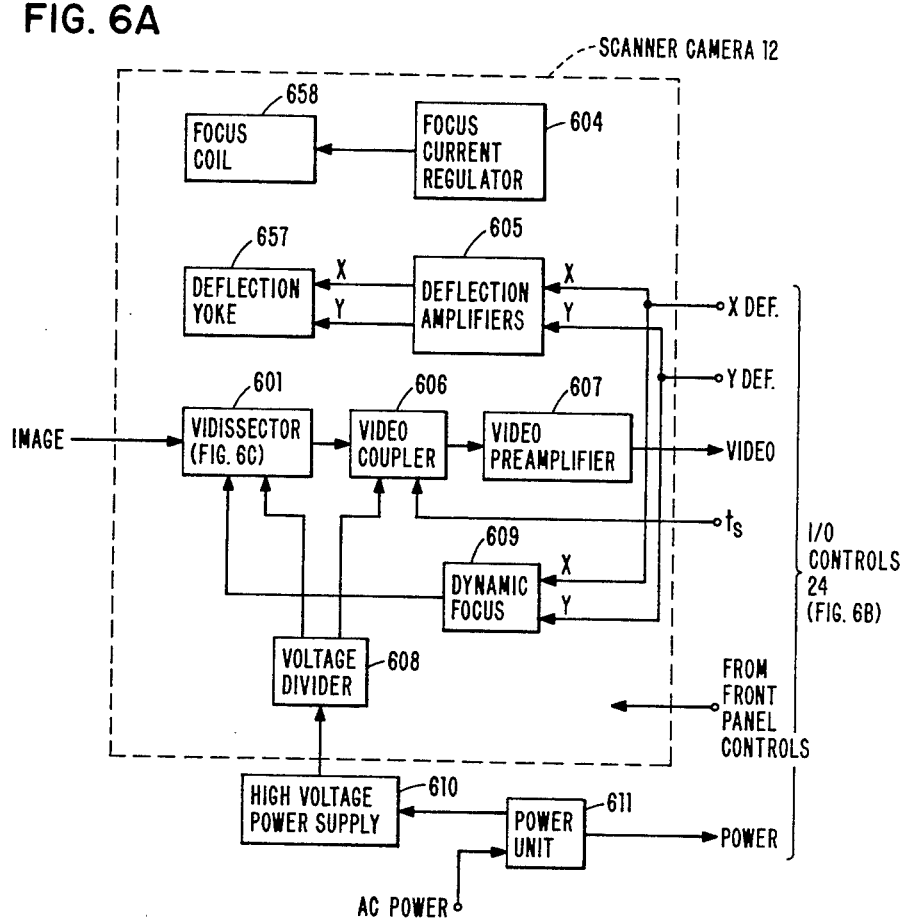
FIG. 6A is a block diagram of an image dissector camera unit.
Figure 6B:
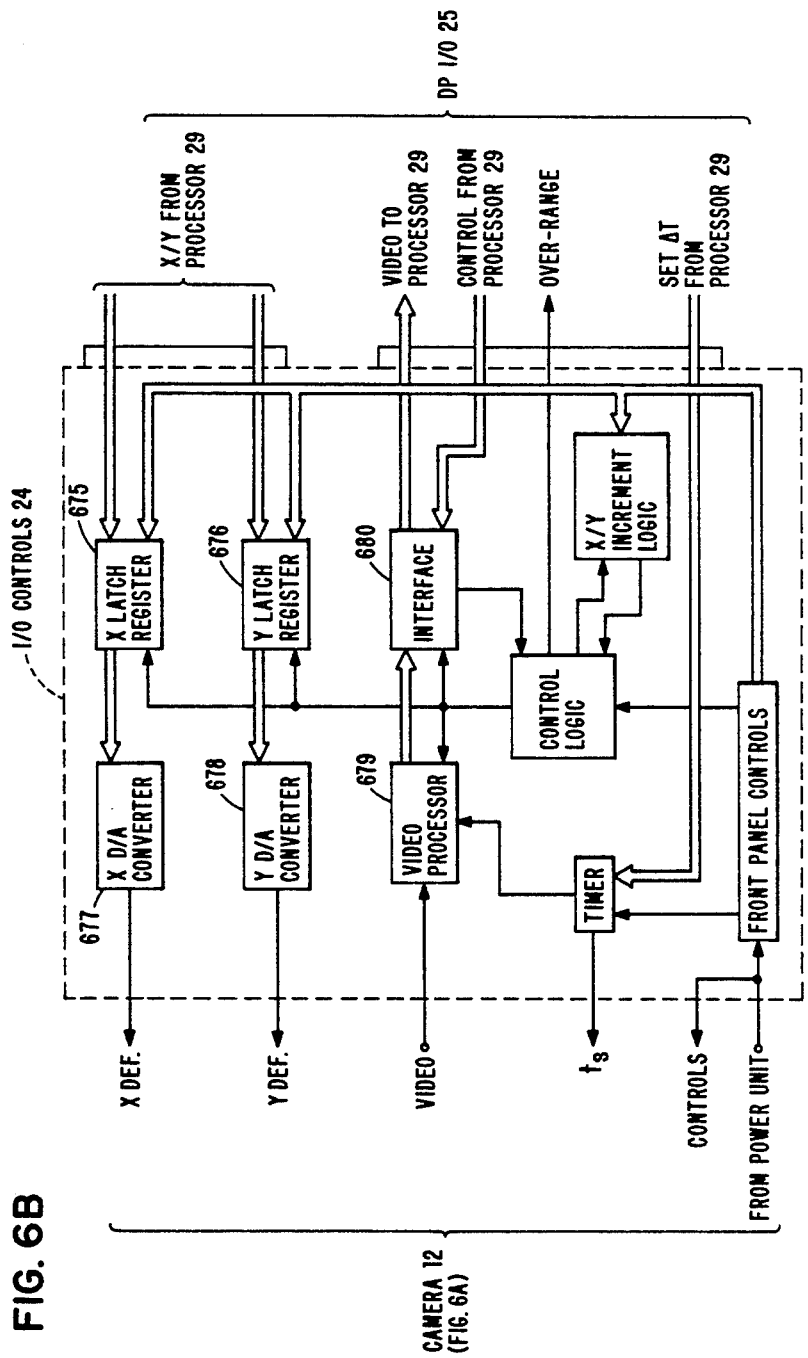
FIG. 6B is a block diagram of an image dissector camera control unit.

Referring again to FIG. 6A, the focus coil 658 is driven by focus current regulator source 604, and the deflection coils 657 are driven by deflection amplifiers 605. A video coupler 606 couples the high voltage vidissector 601 anode current to a video preamplifier 607 via line 659. A power supply 611 is connected to a high voltage power supply 610 which in turn drives the vidissector 601 through a voltage divider 608. Dynamic focusing is achieved by dynamic focusing circuits 609 which allow the vidissector 601 tube to have adjusted its photocathode voltage. In operation, the scanner camera 12 receives deflection signals for the X and Y directions at its deflection amplifier 605 so that magnetic fields are generated by the deflection yoke 657 to cause the vidissector tube 601 to scan the image 650 and supply video signals corresponding to the light values on the image at the video output of video preamplifier 607. Referring to FIG. 6B, there is shown input/output control circuitry 24 which supplies the X and Y deflection signals and receives the video information from the scanner camera 12. The input/output control circuit 24 connects to the data processing input circuit 25 which is connected to the processor 29 by way of the input/output channel 28. It functions to convert to deflection signals usable by the scanner camera 12 digital data received from the processor 29. Similarly, it supplies to the processor 29 digital data representations of the video signals which are a function of the light values of the image. The processor 29 supplies to the input/output control 24 digital data words (twenty-eight bits each) representing X and Y coordinates at which the electron beam of the vidissector camera tube 601 is to focus a point. The X and Y latch registers 675 and 676 hold this information until digital-to-analog converters 677 and 678 can supply analog signals corresponding to the digital information held in the latches 675 and 676. Video information in the form of analog signals from the camera tube 601 is supplied to the video processor 679, which samples the signals and converts them to digital data representations which are converted to appropriate voltage levels usable by the processor 29 in the interface circuits 680.

Operation—FIGS. 3, 7, 8A–8C

Figure 7:
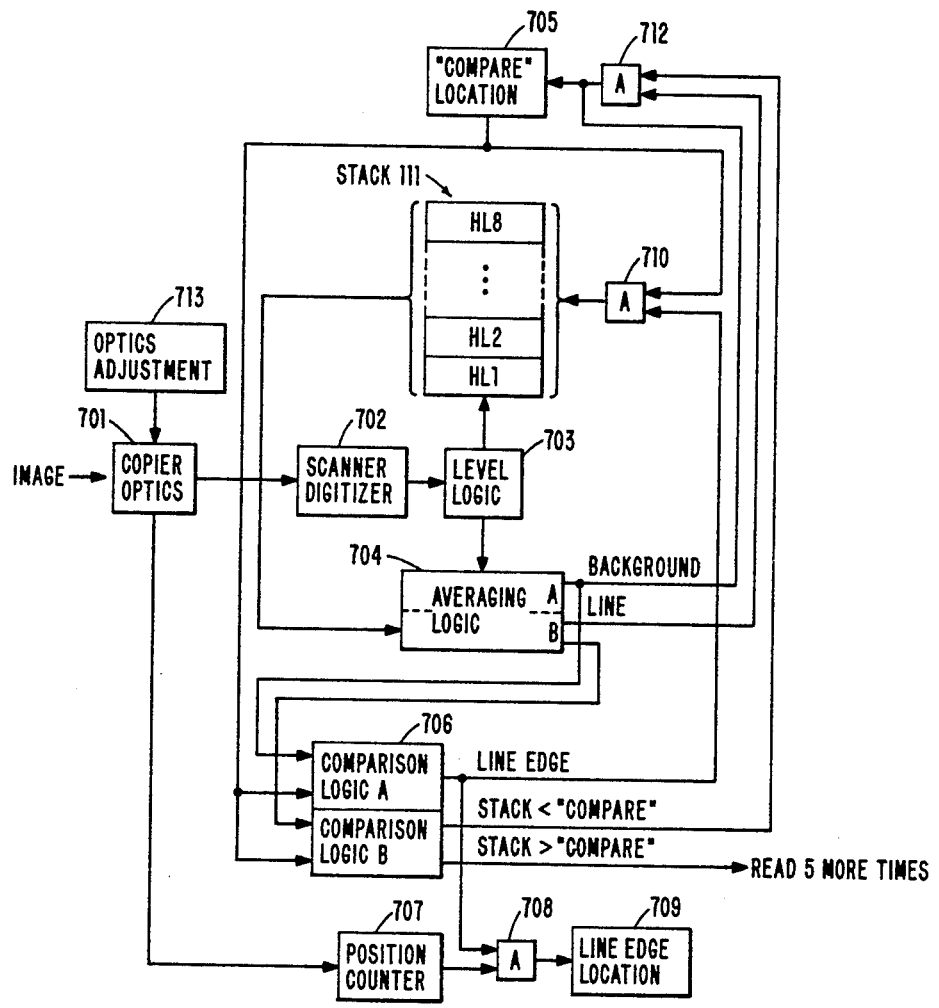
FIG. 7 is a block diagram illustrating operation of the invention.

The operation of the invention will now be described with reference to FIGS. 3, 7, 8A–8C in particular. Referring first to FIG. 7, there is shown a block diagram useful in illustrating operations performed in the processor 29. The copier optics elements, for example the elements 1-12 shown in FIG. 1A, are enclosed within the copier optics block 701, and the electronic scanner digitizing circuits, for example those shown as elements 12, 24, 25, 28 in FIG. 1A, appear as scanner digitizer block 702. Blocks 703-713 illustrate areas within the input/output channel 28, processor 29 and storage 30 of FIG. 1A. Adjustments to the optics in FIG. 1A achieved there by stepping motors 13-22, motion interface 26 and sensor input/output circuit 27 are illustrated by the line labeled "optics adjustment 714".

The operation of the invention will be described in sections based on FIG. 3: finding a line, scanning a line, checking magnification and aligning the document glass.

Finding a Line

Referring to FIG. 3, in each of areas I-IX, there is an operation initially performed to find the location of a line and note its position. This is accomplished by moving the camera 12 under control of motor 13, and carriage 3 under control of motor 21, to an area and initiating an electronic scan of that area. Referring to the flow diagram of FIG. 8A, the camera 12 is reset to a home (area I) position and a line edge "find" operation commenced. Referring to FIG. 7, the image in the copier optics 701 is digitized point by point by the circuitry 702. Data representing the light level of every point on the image area presented to the camera 12 is digitally represented to level logic 703. As points on the document 1 are scanned, background light levels will, initially, be digitized. At least ten background light level readings are taken, averaged in averaging logic 704 and stored in a "compare" location 705. Comparison logic 706 compares the average background light value in the "compare" location 705 with the average of subsequent light values and updates the "compare" location to contain the current average. When the comparison logic 706 detects an averaging logic 704 output significantly less than the value in the "compare" location (for example 80% of the background value), a signal indicating that a line edge has been sensed is supplied. A position counter 707 is stepped to indicate the coordinates of every point scanned by the scanner digitizer 702 on the master document 1. When the comparison logic 706 indicates that a line edge has been sensed, the current position count in the position counter 707 is gated by AND circuit 708 into a line edge location register 709. The comparison logic 706 causes the average background level in the "compare" location to be gated by AND circuit 710 into a stack 711 consisting of positions HL1-HL8. This stack 711 is known either as a "push-up" or "push-down" stack, meaning that it operates on the principle of last-in/first-out. The actual operation of the stack 711 need not necessarily correspond to this description. For example, it may be accessed by a pointer digit maintained in a pointer register which accesses one of registers HL1-HL8 after another, without necessarily causing transfers of data among any of the registers HL1-HL8.

Scan Line

Figure 8A:
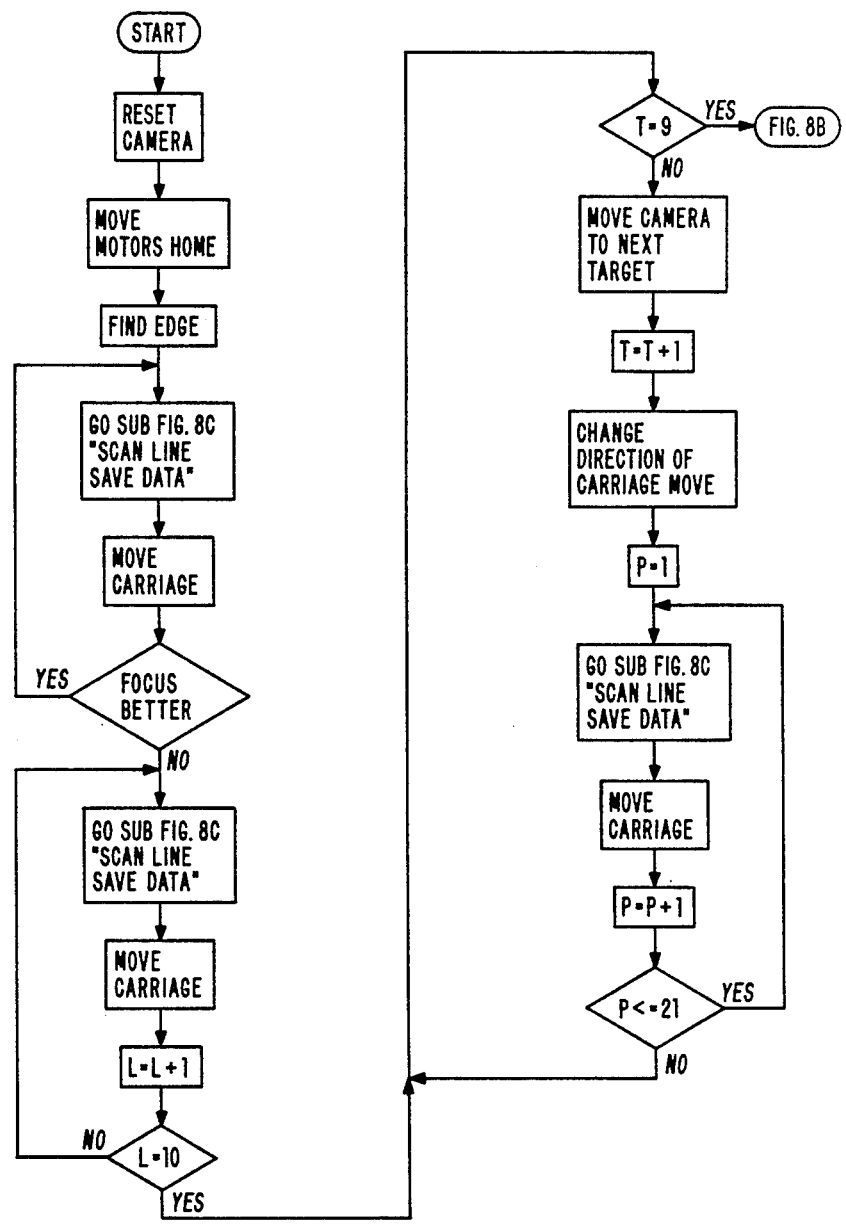
FIGS. 8A-8C are flow diagrams illustrating operation of the invention.

Once the edge of a line within an area is located, the scanning operation will repeatedly cause the copier optics 701 to be adjusted, thus changing its focus, while simultaneously causing the scanner digitizer 702 to examine the line for contrast between the darkness of the line and the brightness of the background. The relative contrast may be reversed by providing a dark background and a light line and looking for the brightest image on the line. In FIGS. 8A and 8C, a "scan line, save data" operation is performed to calculate an average background light value, load it into the stack, read line light values, enter them into the stack, compare the stack average to the calculated background value and recognize when the darkest line light value has been detected. Initially, when the line edge is detected, the average background light value in "compare" location 705 is placed into each of the stack 711 registers HL1-HL8. As subsequent points (on the line) are read, the corresponding digital values from the level logic 703 are pushed into the stack 711 register HL1 and the stack (or its pointer) is advanced. The digital values in the stack 711 registers HL1-HL8 are averaged in averaging logic 704 and compared to the "compare" location 705 value by comparison logic 706. If the average of the values in the stack 711 is less than the value in the "compare" location 705, the average value from the averaging logic 704 replaces the previous value in the "compare" location. This is achieved by gating of AND circuit 712 by comparison logic 706. The next point is then read. When averaging logic 704 detects that the current average of the light levels is equal to or more than the contents of the "compare" location 705, the comparison logic 706 causes five more readings to be taken. If the additional readings give another light level average lower than the value in the "compare" location 705, that lower average is entered into the "compare" location and readings are continued as before. However, if all subsequent readings give greater average light values, it is assumed that lowest light level had occurred, and that light level (stored in the "compare" location 705) is used together with indicia of optics adjustment 713 which corresponds to that light level. That is, the condition of best focus is assumed to occur at the point at which the line appears to be darkest with respect to the background.

Figure 8B:
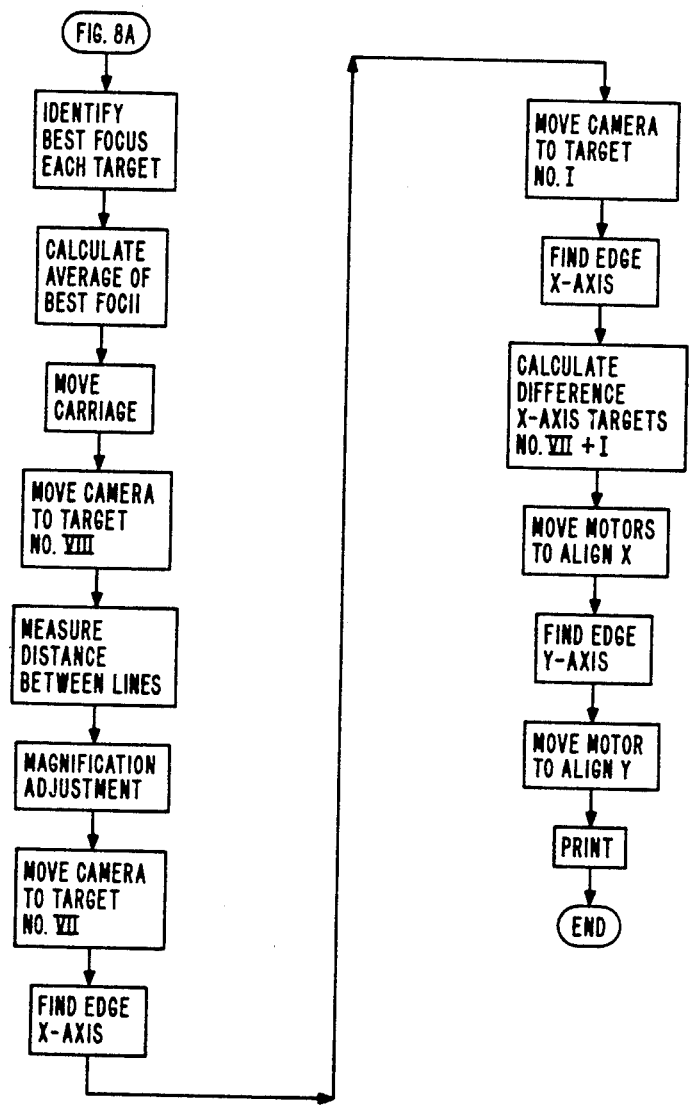
Figure 8C:
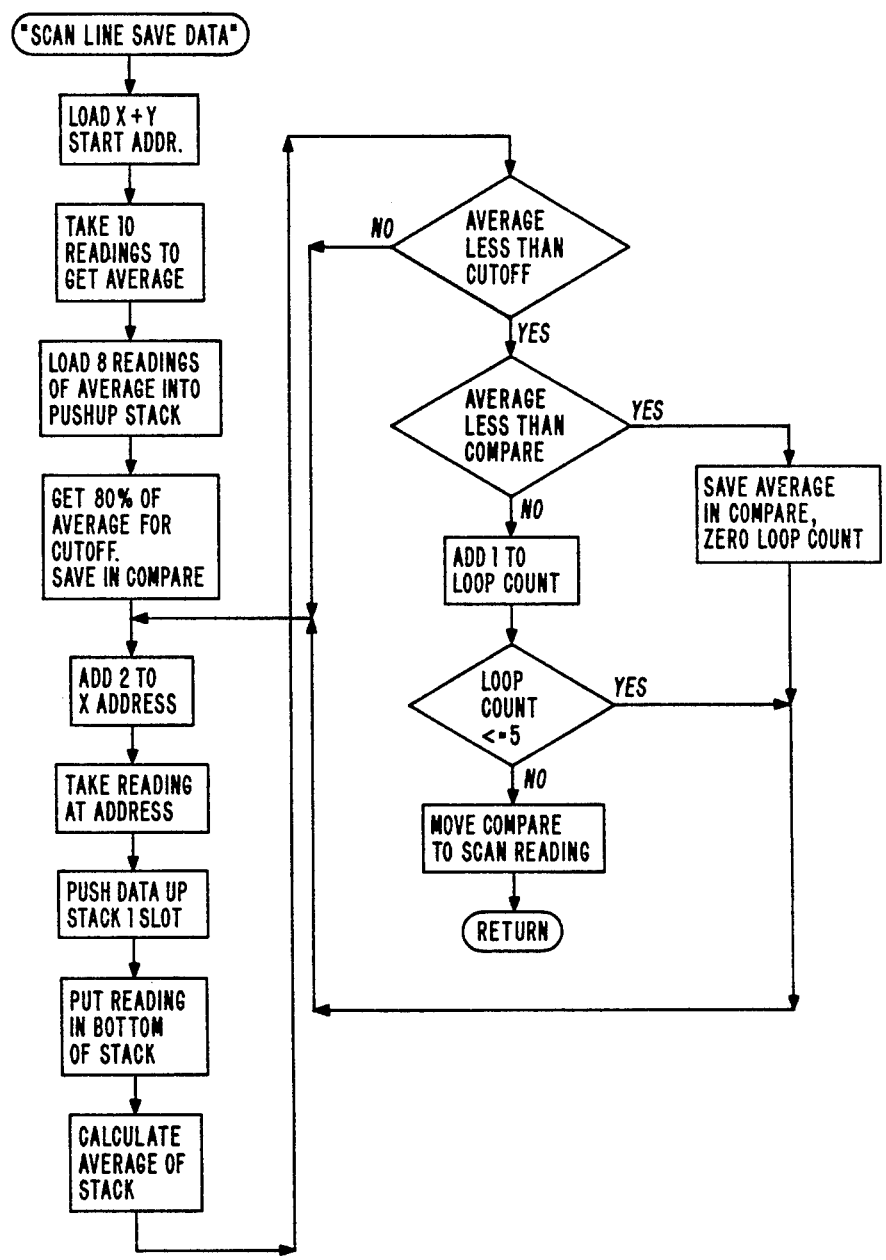

In FIGS. 8A and 8B, the "find" and "scan" operations are repeated for each area I-IX. Then the optimum focus is calculated, the optics are adjusted to give this focus and area VIII is examined again.

Magnification Check

When the area VIII in FIG. 3 is scanned a second time, two successive find operations are repeated for the two outside vertical lines in area VIII. The operations are identical to those described except that the position counter 707 supplies two sets of coordinates to the line edge location 709, one for each line. The processor 29 thereafter calculates the difference between the positions and relates it to the desired magnification. For example, if the apparent distance between the edges of the two lines is greater than desired, the magnification is too large and must be reduced by appropriate adjustment 713 of the optics 701. In FIGS. 8A and 8B, areas VII and I are next examined again.

Document Glass Adjustment

The examination of areas VII and I in FIG. 3 involves the examination of the coordinates of segments of a single vertical line. If the document glass 2 is properly adjusted, the horizontal coordinates will be identical. As described previously, the line edge for each of the areas is determined and stored in the line edge location 709. If there is a difference between the data resulting from the examination of the single line in areas VII and I, appropriate adjustments via the optics adjustment 713 are made to the copier optics 701 until the line segments fall within one line, indicating that the document glass 2 is properly aligned.

While the invention has been particularly shown and described with reference to preferred embodiments thereof, it will be understood by those skilled in the art that various changes in form and details may be made therein without departing from the spirit and scope of the invention.

Assembly Language Listing

```
*       IODEF FOR FOCUS PROGRAM FOR OPTIC ADJUSTMENT                    00003950
*                         INPUT REQUEST (VIDEO READY)                   00003960
        IODEF     PI1,ADDRESS=70,BIT=0                                  00003970

*                         READY LINE                                    00003980
        IODEF     PI2,ADDRESS=70,BIT=1                                  00003990

*                         OUTPUT REQUEST (POSITION)                     00004000
        IODEF     DI1,TYPE=SUBGROUP,ADDRESS=72,BITS=(0,1)                00004010

*                         VIDEO DATA                                    00004020
        IODEF     DI2,TYPE=SUBGROUP,ADDRESS=72,BITS=(7,9)                00004030

*                         CAMERA LEFT/RIGHT SWITCH (10-LEFT,01-RIGHT)   00004040
        IODEF     DI10,TYPE=SUBGROUP,ADDRESS=73,BITS=(0,2)               00004050

*                         CARRIAGE FORE/BACK SWITCH (10-FORE,01 BACK)   00004060
        IODEF     DI11,TYPE=SUBGROUP,ADDRESS=73,BITS=(2,2)               00004070

*                         REFERENCE EDGE #1 SWITCH (10-IN,01-OUT)        00004080
        IODEF     DI20,TYPE=SUBGROUP,ADDRESS=73,BITS=(4,2)               00004090

*                         REFERENCE EDGE #2 SWITCH (10-IN,01-OUT)        00004100
        IODEF     DI21,TYPE=SUBGROUP,ADDRESS=73,BITS=(6,2)               00004110

*                         REFERENCE EDGE #3 SWITCH (10-IN,01-OUT)        00004120
        IODEF     DI22,TYPE=SUBGROUP,ADDRESS=73,BITS=(8,2)               00004130

*                         X POSITION ADDRESS                            00004140
        IODEF     DO1,TYPE=SUBGROUP,ADDRESS=60,BITS=(2,14)               00004150

*                         Y POSITION ADDRESS                            00004160
        IODEF     DO2,TYPE=SUBGROUP,ADDRESS=61,BITS=(2,14)               00004170

*                         DWELL TIME                                    00004180
        IODEF     DO3,TYPE=SUBGROUP,ADDRESS=62,BITS=(0,2)                00004190

*                         OUTPUT ACKNOWLEDGE (POSITION)                 00004200
        IODEF     DO4,TYPE=SUBGROUP,ADDRESS=62,BITS=(2,1)                00004210

*                         INPUT ACKNOWLEDGE (VIDEO)                     00004220
        IODEF     DO5,TYPE=SUBGROUP,ADDRESS=62,BITS=(3,1)                00004230

*                         SET DWELL TIME                                00004240
        IODEF     DO6,TYPE=SUBGROUP,ADDRESS=62,BITS=(4,1)                00004250

*                         RESET                                         00004260
        IODEF     DO7,TYPE=SUBGROUP,ADDRESS=62,BITS=(5,1)                00004270

*                         MOVE CAMERA LEFT                              00004280
        IODEF     DO10,TYPE=SUBGROUP,ADDRESS=63,BITS=(0,1)               00004290

*                         MOVE CAMERA RIGHT                             00004300
        IODEF     DO11,TYPE=SUBGROUP,ADDRESS=63,BITS=(1,1)               00004310

*                         MOVE 2ND CARRIAGE FORWARD                     00004320
        IODEF     DO12,TYPE=SUBGROUP,ADDRESS=63,BITS=(2,1)               00004330

*                         MOVE 2ND CARRIAGE BACK                        00004340
        IODEF     DO13,TYPE=SUBGROUP,ADDRESS=63,BITS=(3,1)               00004350

*                         MOVE CARRIAGE FORWARD                         00004360
        IODEF     DO14,TYPE=SUBGROUP,ADDRESS=63,BITS=(4,1)               00004370

*                         MOVE CARRIAGE BACK                            00004380
        IODEF     DO15,TYPE=SUBGROUP,ADDRESS=63,BITS=(5,1)               00004390
```

Assembly Language Listing (Continued)

```
*                         REFERENCE EDGE #1 IN                          00004400
         IODEF    DO20,TYPE=SUBGROUP,ADDRESS=62,BITS=(6,1)               00004410
*                         REFERENCE EDGE #1 OUT                          00004420
         IODEF    DO21,TYPE=SUBGROUP,ADDRESS=62,BITS=(7,1)               00004430
*                         REFERENCE EDGE #2 IN                           00004440
         IODEF    DO22,TYPE=SUBGROUP,ADDRESS=62,BITS=(8,1)               00004450
*                         REFERENCE EDGE #2 OUT                          00004460
         IODEF    DO23,TYPE=SUBGROUP,ADDRESS=62,BITS=(9,1)               00004470
*                         REFERENCE EDGE #3 IN                           00004480
         IODEF    DO24,TYPE=SUBGROUP,ADDRESS=63,BITS=(6,1)               00004490
*                         REFERENCE EDGE #3 OUT                          00004500
         IODEF    DO25,TYPE=SUBGROUP,ADDRESS=63,BITS=(7,1)               00004510
*
*              CAMERA INITIALIZATION                                     00004530
*                                                                       00004540
START    EQU      *                                                      00004550
         RESET    PI2                                                    00004560
         SBIO     DO7,(PULSE,UP)                                         00004570
         WAIT     PI2              WAIT FOR READY LINE TO COME UP        00004580
         SBIO     DO3,3            LOAD DWELL TIME                       00004590
         SBIO     DO6,(PULSE,UP)   SET DWELL TIME                        00004600
BACKEDGE EQU      *                                                      00004610
         MOVE     COMF,0           ZERO COMPARE DATA                     00004620
         MOVE     BUFF,511,189     SET WORK AREAS TO MAX ,               00004630
         MOVE     BUFF+378,0,67    ZERO REST                             00004640
         MOVE     CARSTEP,0        RESET STEPS TO CARRIAGE HOME          00004650
         QUESTION '@DO YOU WANT TO FOCUS? ',YES=LISTY                    00004660
         MOVE     FOCSW,1                                                00004670
         GOTO     R1R2                                                   00004680
LISTY    PRINTEXT '@Y CONSTANT ADDRESSES ARE: '                          00004690
                                                                        00004700

PRINTEXT '@   LEFT TARGET = '                                   00004710

PRINTNUM YCONSTL,MODE=HEX                                       00004720
         PRINTEXT '@ CENTER TARGET = '                                   00004730

PRINTNUM YCONSTC,MODE=HEX                                       00004740
         PRINTEXT '@  RIGHT TARGET = '                                   00004750

PRINTNUM YCONSTR,MODE=HEX                                       00004760
         QUESTION '@DO YOU WANT TO CHANGE THEM? ',NO=TGT1                00004770

GETLEFT  GETVALUE YCONSTL,'@ENTER Y ADDR FOR LEFT TARGET ',MODE=HEX      00004780

IF       (YCONSTL,LT,X'0500'),GOTO,GETLEFT                      00004790
         IF       (YCONSTL,GT,X'3500'),GOTO,GETLEFT                      00004800
GETCNTR  GETVALUE YCONSTC,'@ENTER Y ADDR FOR CENTER TARGET ',MODE=HEX    00004810
         IF       (YCONSTC,LT,X'0500'),GOTO,GETCNTR                      00004820
         IF       (YCONSTC,GT,X'3500'),GOTO,GETCNTR                      00004830
GETRGHT  GETVALUE YCONSTR,'@ENTER Y ADDR FOR RIGHT TARGET ',MODE=HEX     00004840
         IF       (YCONSTR,LT,X'0500'),GOTO,GETRGHT                      00004850
         IF       (YCONSTR,GT,X'3500'),GOTO,GETRGHT                      00004860
         GOTO     TGT1             GO FOCUS FIRST TARGET                 00004870
*    START OF FOCUS ROUTINE                                              00004890
TGT1     EQU      *                                                      00004900
         MOVE     YSAVE,XCONST     RESET X ADDR                          00004910
         MOVE     YSAVE,YCONSTL    INIT Y FOR LEFT TARGET                00004920
```

Assembly Language Listing (Continued)

```
                MOVE        T1LOOP,9                INITIALIZE LOOP COUNT       00004930
                MOVE        CNT,0                   ZERO COUNT                  00004940
                MOVE        DIRECT,1                SET DIRECTION TO FORWARD    00004950
                MOVE        DONE,0                  ZERO DONE SWITCH            00004960
                CALL        XFIND                   GO FIND X LINE              00004970
                IF          (CODE,NE,-1),GOTO,ERRORTN                           00004980
                MOVE        XADD1,XSAVE             SAVE START X ADDRESS        00004990
    XLOOP       EQU         *                                                   00005000
                CALL        XSCAN                   GO SCAN X LINE FOR FOCUS    00005010
                IF          (CODE,NE,-1),GOTO,ERRORTN  CHECK RETURN CODE        00005020
                IF          (FIRSTSW,EQ,0)          IF FIRST TIME THRU          00005030
                MOVE        FIRSTSW,1               TURN OFF FIRST TIME SWITCH  00005040
                GOTO        XPLUG                   BYPASS COMPARE              00005050
                ENDIF                                                           00005060
                IF          (DIRECT,EQ,1)           GOING FORWARD WITH FOCUS?   00005070
                ADD         XSAVE,22                MOVE X START ADDR TO RIGHT  00005080
                ELSE                                                            00005090
                SUB         XSAVE,22                MOVE TO LEFT                00005100
                ENDIF                                                           00005110
                IF          (CNT,LE,3),GOTO,XNODIR  3 TRIES BEFORE SET DIR.     00005120
                GOTO        (XNODIR,XFODIR,XBADIR),DIRECT                       00005130
    XNODIR      EQU         *                                                   00005140
                IF          (BUFF1+36,GT,VALUE)     IF FOCUS BETTER             00005150
                MOVE        DIRECT,1                SET DIRECT TO FORWARD       00005160
                GOTO        XPLUG                                               00005170
                ENDIF                                                           00005180
                IF          (BUFF1+36,LT,VALUE)     IF FOCUS WORSE              00005190
                MOVE        DIRECT,2                SET DIRECT TO BACKWARD      00005200
                GOTO        XPLUG                                               00005210
                ENDIF                                                           00005220
                GOTO        XPLUG                                               00005230
    XFODIR      EQU         *                                                   00005240
                IF          (BUFF1+40,GT,VALUE),GOTO,XPLUG GOING IN RIGHT DIRECT 00005250
                MOVE        XFOCUS,BUFF1+40         SAVE X FOCUS READING        00005260
                MOVE        DONE,1                  INDICATE IN FOCUS           00005270
                GOTO        XPLUG                                               00005280
    XBADIR      EQU         *                                                   00005290
                IF          (BUFF1+40,GT,VALUE),GOTO,XPLUG GOING IN RIGHT DIRECT 00005300
                MOVE        XFOCUS,BUFF1+40         SAVE X FOCUS READING        00005310
                MOVE        DONE,1                  INDICATE IN FOCUS           00005320
                GOTO        XPLUG                                               00005330
    XPLUG       EQU         *                                                   00005340
                MOVE        BUFF1,BUFF1+2,20        PUSH DATA UP STACK          00005350
                MOVE        BUFF1+40,VALUE          SAVE READING COUNT          00005360
                ADD         CNT,1                   ADD 1 TO COUNT              00005370
                IF          (DIRECT,EQ,2)           DIRECT = 2,MOVE CARR. BACK  00005380
                CALL        CARBACK                 MOVE CARRIAGE BACK          00005390
                ELSE                                                            00005400
                CALL        CARFORE                 MOVE CARRIAGE FORWARD       00005410
                ENDIF                                                           00005420
                IF          (DONE,EQ,1),GOTO,XDONE  DONE WITH X FOCUS           00005430
                GOTO        XLOOP                                               00005440
    XDONE       EQU         *                                                   00005450
                DO          9,P1=T1LOOP             TAKE 9 OR 10 MORE READINGS  00005460
                CALL        XSCAN                   GO SCAN X FOR FOCUS         00005470
                IF          (CODE,NE,-1)            CHECK RETURN CODE           00005480
                IF          (CODE,EQ,1)             CODE = 1,COULDN'T FIND LINE 00005490
                MOVE        VALUE,511               SET VALUE TO 511            00005500
                GOTO        T1CK                    GO CHECK FIRST SW           00005510
                ENDIF                                                           00005520
                GOTO        ERRORTN                 CODE ¬= 1, TAKE ERROR EXIT  00005530
                ENDIF                                                           00005540
    T1CK        MOVE        BUFF1,BUFF1+2,20        PUSH DATA UP STACK          00005550
                MOVE        BUFF1+40,VALUE          MOVE DATA TO STACK          00005560
                IF          (DIRECT,EQ,2)                                       00005570
                CALL        CARBACK                 BACK                        00005580
                ELSE                                                            00005590
                CALL        CARFORE                 FORWARD                     00005600
                ENDIF                                                           00005610
                IF          (DIRECT,EQ,1)           GOING FORWARD WITH FOCUS?   00005620
                ADD         XSAVE,22                MOVE START X ADDR TO RIGHT  00005630
                ELSE                                                            00005640
```

Assembly Language Listing (Continued)

```
             SUB      XSAVE,22                    MOVE TO LEFT                       00005650
             ENDIF                                                                   00005660
             IF       (VALUE,LT,XFOCUS)           KEEP LOOKING FOR LOWER VALUE       00005670
             MOVE     XFOCUS,VALUE                                                   00005680
             MOVE     T1LOOP,10                   RESET T1LOOP FOR 10 READINGS       00005690
             GOTO     XDONE                                                          00005700
             ENDIF                                                                   00005710
             ENDDO                                                                   00005720

*     FOCUS ROUTINE FOR PROJECTED IMAGE #2                                           00005740
TARGET2  EQU      *                                                                  00005750
             MOVE     GOSTEPS,T1T2STEP            MOVE CAMERA TO TARGET 2            00005760
             CALL     GOAWAY                      MOVE CAMERA                        00005770
             IF       (CODE,EQ,1),GOTO,CLIMERR    YES, GO TO ERROR ROUTINE           00005780
             MOVE     TARGET,2                    SET FOR TARGET 2                   00005790
             MOVE     BKSTEPS,T1T2STEP            MOVE CAMERA STEPS TO BACK STEPS    00005800
             MOVE     XSAVE,XCONST                RESET X ADDR                       00005810
             MOVE     YSAVE,YCONSTC               INIT Y FOR CENTER TARGET           00005820
             MOVE     DONE,0                      ZERO DONE SWITCH                   00005830
             CALL     XFIND                       GO FIND X LINE                     00005840
             IF       (CODE,NE,-1),GOTO,ERRORTN                                      00005850
             MOVE     XADD2,XSAVE                 SAVE START X ADDRESS               00005860
             MOVE     #1,40                       INITIALIZE INDEX REG #1            00005870
             DO       21                          TAKE 21 DIFFERENT READINGS         00005880
             IF       (DIRECT,EQ,2)               MOVE CARRIAGE                      00005890
             CALL     CARFORE                     FORWARD                            00005900
             ELSE                                                                    00005910
             CALL     CARBACK                     BACK                               00005920
             ENDIF                                                                   00005930
             CALL     XSCAN                       GO SCAN X LINE FOR FOCUS           00005940
             IF       (CODE,NE,-1)                CHECK RETURN CODE                  00005950
             IF       (CODE,EQ,1)                 CODE = 1, COULDN'T FIND LINE       00005960
             MOVE     VALUE,511                   SET VALUE TO 511                   00005970
             GOTO     T2CK                        GO CHECK FIRST SW                  00005980
             ENDIF                                                                   00005990
             GOTO     ERRORTN                     TAKE ERROR EXIT                    00006000
             ENDIF                                                                   00006010
T2CK         IF       (FIRSTSW,EQ,0)              FIRST TIME THROUGH                 00006020
             MOVE     FIRSTSW,1                   TURN OFF FIRST TIME SW             00006030
             GOTO     X2PLUG                      GO L PLUG VALUE                    00006040
             ENDIF                                                                   00006050
             IF       (DIRECT,EQ,2)               CARRIAGE GOING FORWARD             00006060
             SUB      XSAVE,4                     BACK OFF START ADDR BY 4           00006070
             ELSE                                                                    00006080
             ADD      XSAVE,3                     MOVE START TO RIGHT                00006090
             ENDIF                                                                   00006100
             IF       ((BUFF2,#1),LE,VALUE)       PAST FOCUS POINT                   00006110
             IF       (DONE,EQ,0)                 YES                                00006120
             MOVE     DONE,1                      TURN ON SWITCH FOR FOCUS REACHED   00006130
             ENDIF                                                                   00006140
             ENDIF                                                                   00006150
             SUB      #1,2                        SUB 2 FROM INDEX #1                00006160
X2PLUG       MOVE     (BUFF2,#1),VALUE            SAVE VALUE                         00006170
             ENDDO                                                                   00006180
             IF       (DONE,EQ,0),GOTO,NOFOC      DID NOT FIND FOCUS POINT           00006190

*     FOCUS ROUTINE FOR PROJECTED TARGET #3                                          00006210
TARGET3  EQU      *                                                                  00006220
             MOVE     GOSTEPS,T2T3STEP            MOVE CAMERA TO TARGET 3            00006230
             CALL     GOAWAY                      MOVE CAMERA                        00006240
             IF       (CODE,EQ,1),GOTO,CLIMERR    YES, GO TO ERROR ROUTINE           00006250
             MOVE     TARGET,3                    SET FOR TARGET 3                   00006260
             ADD      BKSTEPS,T2T3STEP            ADD CAMERA STEPS TO BACK STEPS     00006270
             MOVE     XSAVE,XCONST                RESET X ADDR                       00006280
             MOVE     YSAVE,YCONSTR               INIT Y FOR RIGHT TARGET            00006290
             MOVE     DONE,0                      ZERO DONE SWITCH                   00006300
             CALL     XFIND                       GO FIND X LINE                     00006310
             IF       (CODE,NE,-1),GOTO,ERRORTN                                      00006320
             MOVE     XADD3,XSAVE                 SAVE START X ADDRESS               00006330
             MOVE     #1,0                        INITIALIZE INDEX REG #1            00006340
             DO       21                          TAKE 21 DIFFERENT READINGS         00006350
             CALL     XSCAN                       GO SCAN X LINE FOR FOCUS           00006360
             IF       (CODE,NE,-1)                CHECK RETURN CODE                  00006370
             IF       (CODE,EQ,1)                 CODE = 1, COULDN'T FIND LINE       00006380
```

Assembly Language Listing (Continued)

```
              MOVE     VALUE,511              SET VALUE TO 511                     00006390
              GOTO     T3CK                   GO CHECK FIRST SW                    00006400
              ENDIF                                                                00006410
              GOTO     ERRORTN                TAKE ERROR EXIT                      00006420
              ENDIF                                                                00006430
     T3CK     IF       (DIRECT,EQ,1)          CARRIAGE GOING FORWARD               00006440
              SUB      XSAVE,29               BACK OFF START ADDR BY 4             00006450
              ELSE                                                                 00006460
              ADD      XSAVE,27               MOVE START TO RIGHT                  00006470
              ENDIF                                                                00006480
              IF       (FIRSTSW,EQ,0)         FIRST TIME THROUGH                   00006490
              MOVE     FIRSTSW,1              TURN OFF FIRST TIME SW               00006500
              GOTO     X3PLUG                 GO PLUG VALUE                        00006510
              ENDIF                                                                00006520
              IF       ((BUFF3,#1),LE,VALUE)  PAST FOCUS POINT                     00006530
              IF       (DONE,EQ,0)            YES                                  00006540
              MOVE     DONE,1                 TURN ON SWITCH FOR FOCUS REACHED     00006550
              ENDIF                                                                00006560
              ENDIF                                                                00006570
              ADD      #1,2                   ADD 2  TO   INDEX #1                 00006580
     X3PLUG   MOVE     (BUFF3,#1),VALUE       SAVE VALUE                           00006590
              IF       (DIRECT,EQ,2)          MOVE CARRIAGE                        00006600
              CALL     CARBACK                BACK                                 00006610
              ELSE                                                                 00006620
              CALL     CARFORE                FORWARD                              00006630
              ENDIF                                                                00006640
              ENDDO                                                                00006650
              IF       (DONE,EQ,0),GOTO,NOFOC DID NOT FIND FOCUS POINT             00006660
     *                                                                             00006680
     *   MOVE THE CARRIAGE FROM THE 1ST ROW OF TARGETS TO THE 2ND                  00006690
     *   ROW OF TARGETS                                                            00006700
     *                                                                             00006710
     R1R2     DO       171                                                         00006720
              SBIO     DO14,1                 MOVE CARRIAGE FORWARD                00006730
              SBIO     DO14,0                 FROM 1ST ROW TO 2ND ROW              00006740
              DO       120                                                         00006750
              MOVE     A,B                    WAIT FOR CARRIAGE TO MOVE            00006760
              MOVE     B,A                                                         00006770
              ENDDO                                                                00006780
              ENDDO                                                                00006790
              MOVE     CARSTEP,171            SET STEP TO HOME FOR CARRIAGE        00006800
              IF       (FOCSW,EQ,1),GOTO,R2R3                                      00006810
     *   FOCUS ROUTINE FOR PROJECTED TARGET #4                                     00006830
     TARGET4  EQU      *                                                           00006840
              MOVE     TARGET,4               SET TARGET FOR 4                     00006850
              MOVE     XSAVE,XCONST           RESET X ADDR                         00006860
              MOVE     YSAVE,YCONSTR          INIT Y FOR RIGHT TARGET              00006870
              MOVE     DONE,0                 ZERO DONE SWITCH                     00006880
              CALL     XFIND                  GO FIND X LINE                       00006890
              IF       (CODE,NE,-1),GOTO,ERRORTN                                   00006900
              MOVE     XADD4,XSAVE            SAVE START X ADDRESS                 00006910
              MOVE     #1,40                  INITIALIZE INDEX REG #1              00006920
              DO       21                     TAKE 21 DIFFERENT READINGS           00006930
              IF       (DIRECT,EQ,2)          MOVE CARRIAGE                        00006940
              CALL     CARFORE                FORWARD                              00006950
              ELSE                                                                 00006960
              CALL     CARBACK                BACK                                 00006970
              ENDIF                                                                00006980
              CALL     XSCAN                  GO SCAN X LINE FOR FOCUS             00006990
              IF       (CODE,NE,-1)           CHECK RETURN CODE                    00007000
              IF       (CODE,EQ,1)            CODE = 1, COULDN'T FIND LINE         00007010
              MOVE     VALUE,511              SET VALUE TO 511                     00007020
              GOTO     T4CK                   GO CHECK FIRST SW                    00007030
              ENDIF                                                                00007040
              GOTO     ERRORTN                TAKE ERROR EXIT                      00007050
              ENDIF                                                                00007060
     T4CK     IF       (DIRECT,EQ,1)          CARRIAGE GOING FORWARD               00007070
              ADD      XSAVE,27               BACK OFF START ADDR                  00007080
              ELSE                                                                 00007090
              SUB      XSAVE,29               MOVE START TO RIGHT                  00007100
              ENDIF                                                                00007110
              IF       (FIRSTSW,EQ,0)         FIRST TIME THROUGH                   00007120
              MOVE     FIRSTSW,1              TURN OFF FIRST TIME SW               00007130
```

Assembly Language Listing (Continued)

```
              GOTO     X4PLUG                    GO PLUG VALUE                      00007140
              ENDIF                                                                 00007150
              IF       ((BUFF4,#1),LE,VALUE)     PAST FOCUS POINT                   00007160
              IF       (DONE,EQ,0)               YES                                00007170
              MOVE     DONE,1                    TURN ON SWITCH FOR FOCUS REACHED   00007180
              ENDIF                                                                 00007190
              ENDIF                                                                 00007200
              SUB      #1,2                      SUB 2 FROM INDEX #1                00007210
X4PLUG        MOVE     (BUFF4,#1),VALUE          SAVE VALUE                         00007220
              ENDDO                                                                 00007230
              IF       (DONE,EQ,0),GOTO,NOFOC DID NOT FIND FOCUS POINT              00007240
*     FOCUS ROUTINE FOR PROJECTED IMAGE #5                                          00007260
TARGET5       EQU      *                                                            00007270
              MOVE     BKSTEPS,T2T3STEP          MOVE CAMERA TO TARGET 2            00007280
              CALL     GOHOME                    MOVE CAMERA                        00007290
              IF       (CODE,EQ,1),GOTO,CAMHOME  GO TO ERROR ROUTINE                00007300
              MOVE     TARGET,5                  SET FOR TARGET 5                   00007310
              MOVE     BKSTEPS,T1T2STEP          MOVE CAMERA STEPS TO BACK STEPS    00007320
              MOVE     XSAVE,XCONST              RESET X ADDR                       00007330
              MOVE     YSAVE,YCONSTC             INIT Y FOR CENTER TARGET           00007340
              MOVE     DONE,0                    ZERO DONE SWITCH                   00007350
              CALL     XFIND                     GO FIND X LINE                     00007360
              IF       (CODE,NE,-1),GOTO,ERRORTN                                    00007370
              MOVE     XADD5,XSAVE               SAVE START X ADDRESS               00007380
              MOVE     #1,0                      INITIALIZE INDEX REG #1            00007390
              DO       21                        TAKE 21 DIFFERENT READINGS         00007400
              CALL     XSCAN                     GO SCAN X LINE FOR FOCUS           00007410
              IF       (CODE,NE,-1)              CHECK RETURN CODE                  00007420
              IF       (CODE,EQ,1)               CODE = 1, COULDN'T FIND LINE       00007430
              MOVE     VALUE,511                 SET VALUE TO 511                   00007440
              GOTO     T5CK                      GO CHECK FIRST SW                  00007450
              ENDIF                                                                 00007460
              GOTO     ERRORTN                   TAKE ERROR EXIT                    00007470
              ENDIF                                                                 00007480
T5CK          IF       (FIRSTSW,EQ,0)            FIRST TIME THROUGH                 00007490
              MOVE     FIRSTSW,1                 TURN OFF FIRST TIME SW             00007500
              GOTO     X5PLUG                    GO PLUG VALUE                      00007510
              ENDIF                                                                 00007520
              IF       (DIRECT,EQ,2)             CARRIAGE GOING FORWARD             00007530
              ADD      XSAVE,3                   BACK OFF START ADDR                00007540
              ELSE                                                                  00007550
              SUB      XSAVE,4                   MOVE START TO RIGHT                00007560
              ENDIF                                                                 00007570
              IF       ((BUFF5,#1),LE,VALUE)     PAST FOCUS POINT                   00007580
              IF       (DONE,EQ,0)               YES                                00007590
              MOVE     DONE,1                    TURN ON SWITCH FOR FOCUS REACHED   00007600
              ENDIF                                                                 00007610
              ENDIF                                                                 00007620
              ADD      #1,2                      ADD 2 TO INDEX #1                  00007630
X5PLUG        MOVE     (BUFF5,#1),VALUE          SAVE VALUE                         00007640
              IF       (DIRECT,EQ,2)             MOVE CARRIAGE                      00007650
              CALL     CARBACK                   BACK                               00007660
              ELSE                                                                  00007670
              CALL     CARFORE                   FORWARD                            00007680
              ENDIF                                                                 00007690
              ENDDO                                                                 00007700
              IF       (DONE,EQ,0),GOTO,NOFOC DID NOT FIND FOCUS POINT              00007710
*     FOCUS ROUTINE FOR PROJECTED TARGET #6                                         00007730
TARGET6       EQU      *                                                            00007740
              MOVE     BKSTEPS,T1T2STEP          MOVE CAMERA TO TARGET 6            00007750
              CALL     GOHOME                    MOVE CAMERA                        00007760
              IF       (CODE,EQ,1),GOTO,CAMHOME  GO TO ERROR ROUTINE                00007770
              MOVE     TARGET,6                  SET FOR TARGET 6                   00007780
              MOVE     BKSTEPS,0                 CAMERA AT HOME                     00007790
              MOVE     XSAVE,XCONST              RESET X ADDR                       00007800
              MOVE     YSAVE,YCONSTL             INIT Y FOR LEFT TARGET             00007810
              MOVE     DONE,0                    ZERO DONE SWITCH                   00007820
              CALL     XFIND                     GO FIND X LINE                     00007830
              IF       (CODE,NE,-1),GOTO,ERRORTN                                    00007840
              MOVE     XADD6,XSAVE               SAVE START X ADDRESS               00007850
              MOVE     #1,40                     INITIALIZE INDEX REG #1            00007860
              DO       21                        TAKE 21 DIFFERENT READINGS         00007870
              IF       (DIRECT,EQ,2)             MOVE CARRIAGE                      00007880
```

Assembly Language Listing (Continued)

```
                CALL    CARFORE                 FORWARD                         00007890
                ELSE                                                            00007900
                CALL    CARBACK                 BACK                            00007910
                ENDIF                                                           00007920
                CALL    XSCAN                   GO SCAN X LINE FOR FOCUS        00007930
                IF      (CODE,NE,-1)            CHECK RETURN CODE               00007940
                IF      (CODE,EQ,1)             CODE = 1, COULDN'T FIND LINE    00007950
                MOVE    VALUE,511               SET VALUE TO 511                00007960
                GOTO    T6CK                    GO CHECK FIRST SW               00007970
                ENDIF                                                           00007980
                GOTO    ERRORTN                 TAKE ERROR EXIT                 00007990
                ENDIF                                                           00008000
T6CK            IF      (DIRECT,EQ,1)           CARRIAGE GOING FORWARD          00008010
                SUB     XSAVE,22                BACK OFF START ADDR             00008020
                ELSE                                                            00008030
                ADD     XSAVE,22                MOVE START TO LEFT              00008040
                ENDIF                                                           00008050
                IF      (FIRSTSW,EQ,0)          FIRST TIME THROUGH              00008060
                MOVE    FIRSTSW,1               TURN OFF FIRST TIME SW          00008070
                GOTO    X6PLUG                  GO PLUG VALUE                   00008080
                ENDIF                                                           00008090
                IF      ((BUFF6,#1),LE,VALUE)   PAST FOCUS POINT                00008100
                IF      (DONE,EQ,0)             YES                             00008110
                MOVE    DONE,1                  TURN ON SWITCH FOR FOCUS REACHED 00008120
                ENDIF                                                           00008130
                ENDIF                                                           00008140
                SUB     #1,2                    SUB 2 FROM INDEX #1             00008150
X6PLUG          MOVE    (BUFF6,#1),VALUE        SAVE VALUE                      00008160
                ENDDO                                                           00008170
                IF      (DONE,EQ,0),GOTO,NOFOC  DID NOT FIND FOCUS POINT        00008180
*                                                                               00008200
*       MOVE THE CARRIAGE FROM THE 2ND ROW OF TARGETS TO THE 3RD                00008210
*       ROW OF TARGETS                                                          00008220
*                                                                               00008230
R2R3            DO      171                                                     00008240
                SBIO    D014,1                  MOVE CARRIAGE FORWARD           00008250
                SBIO    D014,0                  FROM 2ND ROW TO 3RD ROW         00008260
                DO      120                                                     00008270
                MOVE    A,B                     WAIT FOR CARRIAGE TO MOVE       00008280
                MOVE    B,A                                                     00008290
                ENDDO                                                           00008300
                ENDDO                                                           00008310
                ADD     CARSTEP,171             ADD STEPS FROM ROW 2 TO ROW 3   00008320
                IF      (FOCSW,EQ,1),GOTO,STREF                                 00008330
*       FOCUS ROUTINE FOR PROJECTED TARGET #7                                   00008350
TARGET7         EQU     *                                                       00008360
                MOVE    TARGET,7                SET FOR TARGET 7                00008370
                MOVE    XSAVE,XCONST            RESET X ADDR                    00008380
                MOVE    YSAVE,YCONSTL           INIT Y FOR LEFT TARGET          00008390
                MOVE    DONE,0                  ZERO DONE SWITCH                00008400
                CALL    XFIND                   GO FIND X LINE                  00008410
                IF      (CODE,NE,-1),GOTO,ERRORTN                               00008420
                MOVE    XADD7,XSAVE             SAVE START X ADDRESS            00008430
                MOVE    #1,0                    INITIALIZE INDEX REG #1         00008440
                DO      21                      TAKE 21 DIFFERENT READINGS      00008450
                CALL    XSCAN                   GO SCAN X LINE FOR FOCUS        00008460
                IF      (CODE,NE,-1)            CHECK RETURN CODE               00008470
                IF      (CODE,EQ,1)             CODE = 1, COULDN'T FIND LINE    00008480
                MOVE    VALUE,511               SET VALUE TO 511                00008490
                GOTO    T7CK                    GO CHECK FIRST SW               00008500
                ENDIF                                                           00008510
                GOTO    ERRORTN                 TAKE ERROR EXIT                 00008520
                ENDIF                                                           00008530
T7CK            IF      (DIRECT,EQ,1)           CARRIAGE GOING FORWARD          00008540
                ADD     XSAVE,22                BACK OFF START ADDR BY 4        00008550
                ELSE                                                            00008560
                SUB     XSAVE,22                MOVE START TO RIGHT             00008570
                ENDIF                                                           00008580
                IF      (FIRSTSW,EQ,0)          FIRST TIME THROUGH              00008590
                MOVE    FIRSTSW,1               TURN OFF FIRST TIME SW          00008600
                GOTO    X7PLUG                  GO PLUG VALUE                   00008610
                ENDIF                                                           00008620
                IF      ((BUFF7,#1),LE,VALUE)   PAST FOCUS POINT                00008630
```

Assembly Language Listing (Continued)

```
               IF      (DONE,EQ,0)            YES                              00008640
               MOVE    DONE,1                 TURN ON SWITCH FOR FOCUS REACHED 00008650
               ENDIF                                                           00008660
               ENDIF                                                           00008670
               ADD     #1,2                   ADD 2 TO INDEX #1                00008680
X7PLUG         MOVE    (BUFF7,#1),VALUE       SAVE VALUE                       00008690
               IF      (DIRECT,EQ,2)          MOVE CARRIAGE                    00008700
               CALL    CARBACK                BACK                             00008710
               ELSE                                                            00008720
               CALL    CARFORE                FORWARD                          00008730
               ENDIF                                                           00008740
               ENDDO                                                           00008750
               IF      (DONE,EQ,0),GOTO,NOFOC DID NOT FIND FOCUS POINT         00008760

*      FOCUS ROUTINE FOR PROJECTED IMAGE #8                                    00008780
TARGET8        EQU     *                                                       00008790
               MOVE    GOSTEPS,T1T2STEP       MOVE CAMERA TO TARGET 8          00008800
               CALL    GOAWAY                 MOVE CAMERA                      00008810
               IF      (CODE,EQ,1),GOTO,CLIMERR  GO TO ERROR ROUTINE           00008820
               MOVE    TARGET,8               SET FOR TARGET 8                 00008830
               MOVE    BKSTEPS,T1T2STEP       MOVE CAMERA STEPS TO BACK STEPS  00008840
               MOVE    XSAVE,XCONST           RESET X ADDR                     00008850
               MOVE    YSAVE,YCONSTC          INIT Y FOR CENTER TARGET         00008860
               MOVE    DONE,0                 ZERO DONE SWITCH                 00008870
               CALL    XFIND                  GO FIND X LINE                   00008880
               IF      (CODE,NE,-1),GOTO,ERRORTN                               00008890
               MOVE    XADD8,XSAVE            SAVE START X ADDRESS             00008900
               MOVE    #1,40                  INITIALIZE INDEX REG #1          00008910
               DO      21                     TAKE 21 DIFFERENT READINGS       00008920
               IF      (DIRECT,EQ,2)          MOVE CARRIAGE                    00008930
               CALL    CARFORE                FORWARD                          00008940
               ELSE                                                            00008950
               CALL    CARBACK                BACK                             00008960
               ENDIF                                                           00008970
               CALL    XSCAN                  GO SCAN X LINE FOR FOCUS         00008980
               IF      (CODE,NE,-1)           CHECK RETURN CODE                00008990
               IF      (CODE,EQ,1)            CODE = 1, COULDN'T FIND LINE     00009000
               MOVE    VALUE,511              SET VALUE TO 511                 00009010
               GOTO    T8CK                   GO CHECK FIRST SW                00009020
               ENDIF                                                           00009030
               GOTO    ERRORTN                TAKE ERROR EXIT                  00009040
               ENDIF                                                           00009050
T8CK           IF      (FIRSTSW,EQ,0)         FIRST TIME THROUGH               00009060
               MOVE    FIRSTSW,1              TURN OFF FIRST TIME SW           00009070
               GOTO    X8PLUG                 GO L PLUG VALUE                  00009080
               ENDIF                                                           00009090
               IF      (DIRECT,EQ,2)          CARRIAGE GOING FORWARD           00009100
               SUB     XSAVE,4                BACK OFF START ADDR BY 4         00009110
               ELSE                                                            00009120
               ADD     XSAVE,3                MOVE START TO RIGHT              00009130
               ENDIF                                                           00009140
               IF      ((BUFF8,#1),LE,VALUE)  PAST FOCUS POINT                 00009150
               IF      (DONE,EQ,0)            YES                              00009160
               MOVE    DONE,1                 TURN ON SWITCH FOR FOCUS REACHED 00009170
               ENDIF                                                           00009180
               ENDIF                                                           00009190
               SUB     #1,2                   SUB 2 FROM INDEX #1              00009200
X8PLUG         MOVE    (BUFF8,#1),VALUE       SAVE VALUE                       00009210
               ENDDO                                                           00009220
               IF      (DONE,EQ,0),GOTO,NOFOC DID NOT FIND FOCUS POINT         00009230

*      FOCUS ROUTINE FOR PROJECTED TARGET #9                                   00009250
TARGET9        EQU     *                                                       00009260
               MOVE    GOSTEPS,T2T3STEP       MOVE CAMERA TO TARGET 9          00009270
               CALL    GOAWAY                 MOVE CAMERA                      00009280
               IF      (CODE,EQ,1),GOTO,CLIMERR  GO TO ERROR ROUTINE           00009290
               MOVE    TARGET,9               SET TARGET TO 9                  00009300
               ADD     BKSTEPS,T2T3STEP       ADD CAMERA STEPS TO BACK STEPS   00009310
               MOVE    YSAVE,XCONST           RESET X ADDR                     00009320
               MOVE    YSAVE,YCONSTR          INIT Y FOR RIGHT TARGET          00009330
               MOVE    DONE,0                 ZERO DONE SWITCH                 00009340
               CALL    XFIND                  GO FIND X LINE                   00009350
               IF      (CODE,NE,-1),GOTO,ERRORTN                               00009360
```

Assembly Language Listing (Continued)

```
              MOVE      XADD9,XSAVE              SAVE START X ADDRESS                   00009370
              MOVE      #1,0                     INITIALIZE INDEX REG #1                00009380
              DO        21                       TAKE 21 DIFFERENT READINGS             00009390
              CALL      XSCAN                    GO SCAN X LINE FOR FOCUS               00009400
              IF        (CODE,NE,-1)             CHECK RETURN CODE                      00009410
              IF        (CODE,EQ,1)              CODE = 1, COULDN'T FIND LINE           00009420
              MOVE      VALUE,511                SET VALUE TO 511                       00009430
              GOTO      T9CK                     GO CHECK FIRST SW                      00009440
              ENDIF                                                                     00009450
              GOTO      ERRORTN                  TAKE ERROR EXIT                        00009460
              ENDIF                                                                     00009470
T9CK          IF        (DIRECT,EQ,1)            CARRIAGE GOING FORWARD                 00009480
              SUB       XSAVE,29                 BACK OFF START ADDR BY 4               00009490
              ELSE                                                                      00009500
              ADD       XSAVE,27                 MOVE START TO RIGHT                    00009510
              ENDIF                                                                     00009520
              IF        (FIRSTSW,EQ,0)           FIRST TIME THROUGH                     00009530
              MOVE      FIRSTSW,1                TURN OFF FIRST TIME SW                 00009540
              GOTO      X9PLUG                   GO PLUG VALUE                          00009550
              ENDIF                                                                     00009560
              IF        ((BUFF9,#1),LE,VALUE)    PAST FOCUS POINT                       00009570
              IF        (DONE,EQ,0)              YES                                    00009580
              MOVE      DONE,1                   TURN ON SWITCH FOR FOCUS REACHED       00009590
              ENDIF                                                                     00009600
              ENDIF                                                                     00009610
              ADD       #1,2                     ADD 2 TO INDEX #1                      00009620
X9PLUG        MOVE      (BUFF9,#1),VALUE         SAVE VALUE                             00009630
              IF        (DIRECT,EQ,2)            MOVE CARRIAGE                          00009640
              CALL      CARBACK                  BACK                                   00009650
              ELSE                                                                      00009660
              CALL      CARFORE                  FORWARD                                00009670
              ENDIF                                                                     00009680
              ENDDO                                                                     00009690
              IF        (DONE,EQ,0),GOTO,NOFOC   DID NOT FIND FOCUS POINT               00009700

MOVE      #1,0                     ZERO INDEX REG                         00009720
              MOVE      WORK,0                   ZERO WORK AREA                         00009730
              DO        9                        DO LOOP FOR 9 TARGETS                  00009740
              MOVE      COMP,511                 INITIALIZE COMPARE TO MAX              00009750
              MOVE      REF,0                    ZERO REF WORK AREA                     00009760
              DO        21,INDEX=LOOPSCAN        LOOK FOR LOW SUM                       00009770

IF        ((BUFF,#1),LT,COMP)      IS SUM LESS THAN COMPARE               00009780
              MOVE      COMP,(BUFF,#1)           YES, SAVE                              00009790
              MOVE      REF,LOOPSCAN             SAVE COUNTER                           00009800
              ENDIF                                                                     00009810
              ADD       #1,2                     ADD 2 TO INDEX REG                     00009820
              ENDDO                                                                     00009830
              MOVE      COMP1,COMP,P1=COMPAD     SAVE LOW VALUE                         00009840
              ADD       COMPAD,2                 BUMP ADDR TO NEXT SLOT                 00009850
              ADD       WORK,REF                 ADD FOCUS PT TO WORK AREA              00009860
              ENDDO                                                                     00009870
              DIVIDE    WORK,9                   GET AVERAGE                            00009880
              IF        (FOCUS,GE,5)             IF REMAINDER 5 OR MORE                 00009890
              ADD       WORK,1                   ADD 1 TO POSITION                      00009900
              ENDIF                                                                     00009910
              MOVE      REFF,WORK                SAVE AVERAGE POSITION                  00009920
              MOVE      BACKCNT,22               INITIALIZE BACK COUNT                  00009930
              SUB       BACKCNT,WORK             SUBTRACT POSITION                      00009940
              MOVE      CFTIME,0                 REDUCE WAIT TIME                       00009950
              MOVE      CBTIME,0                 REDUCE WAIT TIME                       00009960
              DO        22,P1=BACKCNT            BACK UP CARRIAGE                       00009970
              IF        (DIRECT,EQ,2)            MOVE CARRIAGE                          00009980
              CALL      CARFORE                  FORWARD                                00009990
              ELSE                                                                      00010000
              CALL      CARBACK                  BACK                                   00010010
              ENDIF                                                                     00010020
              ENDDO                                                                     00010030
              PRINTEXT  '@FOCUS COMPLETE FOR ALL 9 TARGETS @'                           00010040

WRITE     DS1,BUFF,ERROR=DISKERR   WRITE DATA TO DISK                     00010050

WRITE     DS1,BUFW,ERROR=DISKERR   WRITE DATA TO DISK                     00010060
```

Assembly Language Listing (Continued)

```
              MOVE      BKSTEPS,T2T3STEP     SET UP TO GO TO T2                      00010070
              CALL      GOHOME               MOVE CAMERA T2                          00010080
              IF        (CODE,EQ,1),GOTO,CAMHOME  GO TO ERROR ROUTINE                00010090
MEASURE       EQU       *                                                            00010110
              MOVE      XSAVE,XCONST         RESERT X ADDR                           00010120
              MOVE      YSAVE,YCONSTC        INIT Y FOR CENTER TARGET                00010130
              MOVE      TARGET,81            RESET TO TARGET 8, LINE 1               00010140
              MOVE      BKSTEPS,T1T2STEP     MOVE IN STEPS FROM T2 TO T1             00010150
              MOVE      WORK,0               ZERO WORK                               00010160
              CALL      XFIND                GO FIND LINE                            00010170
              IF        (CODE,NE,-1),GOTO,ERRORTN  TAKE ERROR EXIT                   00010180
              CALL      XEDGE                GO GET EDGE OF FIRST LINE               00010190
              IF        (CODE,NE,-1),GOTO,ERRORTN  TAKE ERROR EXIT                   00010200
              MOVE      REF,XADDR            SAVE X ADDR                             00010210
              ADD       XADDR,3500           ADD 3500 X ADDR TO JUMP LINE            00010220
              MOVE      XSAVE,XADDR          SAVE X ADDR                             00010230
              MOVE      TARGET,82            RESET TO TARGET 8, LINE 2               00010240
              CALL      XFIND                GO FIND THIRD LINE                      00010250
              IF        (CODE,NE,-1),GOTO,ERRORTN  TAKE ERROR EXIT                   00010260
              CALL      XEDGE                GO FIND EDGE OF LINE 2                  00010270
              IF        (CODE,NE,-1),GOTO,ERRORTN  TAKE ERROR EXIT                   00010280
              MOVE      XSAVE,XADDR          SAVE X ADDRESS                          00010290
              SUB       XADDR,REF            FIND DISTANCE IN ADDR POINTS            00010300
              MOVE      REFD,XADDR           SAVE DIFFERENCE                         00010310
              MULT      XADDR,F946,RESULT=SPAD,PREC=SSD  MULT. BY DIST.              00010320
              DIVIDE    SPAD,F1000,RESULT=XADDR,PREC=DSS  GET 10,000 INCH            00010330
              DIVIDE    XADDR,10             SEPERATE TENTHS                         00010340
              MOVE      #1,FOCUS             LOAD INTO INDEX REG #1                  00010350
              MOVE      DISTEXT+16,(CHAR,#1),(1,BYTE) MOVE CHAR TO TEXT              00010360
              DIVIDE    XADDR,10             SEPERATE UNITS                          00010370
              MOVE      #1,FOCUS             LOAD INTO INDEX REG #1                  00010380
              MOVE      DISTEXT+15,(CHAR,#1),(1,BYTE) MOVE CHAR TO TEXT              00010390
              DIVIDE    XADDR,10             SEPERATE TENS                           00010400
              MOVE      #1,FOCUS             LOAD INTO INDEX REG #1                  00010410
              MOVE      DISTEXT+14,(CHAR,#1),(1,BYTE) MOVE CHAR TO TEXT              00010420
              DIVIDE    XADDR,10             SEPERATE HUNDREDS                       00010430
              MOVE      #1,FOCUS             LOAD INTO INDEX REG #1                  00010440
              MOVE      DISTEXT+13,(CHAR,#1),(1,BYTE) MOVE CHAR TO TEXT              00010450
*                                                                                    00010470
*     THIS SECTION OF CODE WILL ADJUST THE BEZEL TO MAKE IT PARALLEL                 00010480
*     TO THE REFERENCE EDGE AND ADJUST THE LEADING EDGE REFERENCE.                   00010490
*                                                                                    00010500
              MOVE      BKSTEPS,T1T2STEP     MOVE CAMERA TO TARGET 7                 00010510
              CALL      GOHOME               MOVE CAMERA                             00010520
              IF        (CODE,EQ,1),GOTO,CAMHOME  GO TO ERROR ROUTINE                00010530
STREF         MOVE      TARGET,7             SET FOR TARGET 7                        00010540
              MOVE      BKSTEPS,0            CAMERA AT HOME EDGE                     00010550
              MOVE      XSAVE,XCONST         RESET X ADDRESS                         00010560
              MOVE      YSAVE,YCONSTL        INIT Y FOR LEFT TARGET                  00010570
              CALL      XFIND                GO FIND LINE                            00010580
              IF        (CODE,NE,-1),GOTO,ERRORTN  TAKE ERROR EXIT                   00010590
              CALL      XEDGE                GO FIND EDGE OF LINE                    00010600
              IF        (CODE,NE,-1),GOTO,ERRORTN  TAKE ERROR EXIT                   00010610
              MOVE      REF,XADDR            SAVE X ADDRESS                          00010620
              CALL      CARRRET              MOVE CARRIAGE TO 1ST ROW                00010630
              MOVE      CARSTEP,0            BACK AT FIRST ROW                       00010640
              MOVE      TARGET,1             SET FOR TARGET 1                        00010650
              MOVE      XSAVE,XCONST         RESET X ADDRESS                         00010660
              CALL      XFIND                GO FIND LINE                            00010670
              IF        (CODE,NE,-1),GOTO,ERRORTN  TAKE ERROR EXIT                   00010680
              CALL      XEDGE                GO FIND EDGE OF LINE                    00010690
              IF        (CODE,NE,-1),GOTO,ERRORTN  TAKE ERROR EXIT                   00010700
              MOVE      XSAVE,XADDR          SAVE X ADDR                             00010710
              PRINTEXT  '@PASS'              *** DEBUG ***                           00010720
              PRINTNUM  PASS                 *** DEBUG ***                           00010730
              PRINTEXT  '@T 1 EDGE = '                                               00010740
              PRINTNUM  XSAVE,MODE=HEX                                               00010750
              PRINTEXT  '@T 7 EDGE = '                                               00010760
              PRINTNUM  REF,MODE=HEX                                                 00010770
              PRINTEXT  SKIP=1                                                       00010780
              IF        (PASS,GE,2),GOTO,PARALLEL    *** DEBUG ***                   00010790
              ADD       PASS,1               *** DEBUG ***                           00010800
```

Assembly Language Listing (Continued)

```
              MOVE      XSAVE1,XSAVE           SAVE ADDR OF LINE AT T 1            00010810
              MOVE      XSAVE7,REF             SAVE ADDR OF LINE AT T 7            00010820
              SUB       XADDR,REF,RESULT=WORK  SUB TO GET DIFFERENCE               00010830
              IF        (WORK,GE,-5),AND,(WORK,LE,5),GOTO,PARALLEL                 00010840

IF        (WORK,LT,0),GOTO,OUT2 SLANT OPPOSIT DIRECTION              00010850
              MOVE      MTRNUM,1               MOTOR NUMBER 1                      00010860
              IF        (WORK,GT,ADLIM),GOTO,SLNTERR   TAKE ERROR EXIT             00010870
              MULT      FUDGE,WORK,RESULT=SPAD,PREC=SSD                            00010880
              DIVIDE    SPAD,100,RESULT=WORK,PREC=DSS                              00010890
              MOVE      STEP2I,0               ZERO STEPS FOR MOTOR #2 IN          00010900
              IF        (WORK,GT,2000)         DOES STEPS EXCEED LIMIT             00010910
              MOVE      STEP1O,2000            YES, SET #1 OUT TO MAX              00010920
              MOVE      STEPOUT,2000           SET STEPS OUT TO MAX                00010930
              SUB       WORK,2000,RESULT=STEP2I PUT REST #2 MOTOR IN               00010940
              MOVE      STEPIN,STEP2I          LOAD # OF STEPS IN                  00010950
              GOTO      SKP1                   SKIP STEP TO SET                    00010960
              ENDIF                                                                00010970
              MOVE      STEP1O,WORK            MOVE STEPS TO DO LOOP               00010980
              MOVE      STEPOUT,WORK           LOAD # OF STEPS OUT                 00010990
SKP1          MOVE      REFR,XADDR             SAVE X ADDRESS                      00011000
              CALL      REF1OUT                GO MOVE BEZEL                       00011010
              .IF       (STEP2I,NE,0)          DO WE HAVE TO MOVE #2 IN            00011020
              CALL      REF2IN                 YES, GO MOVE IT                     00011030
              ENDIF                                                                00011040
              GOTO      DB1                    *** DEBUG ***                       00011050
              GOTO      PARALLEL               GO CHECK EDGE                       00011060
OUT2          EQU       *                                                          00011070
              SUB       REF,XADDR,RESULT=WORK  SUB TO GET DIFFERENCE               00011080
              MOVE      MTRNUM,2               MOTOR NUMBER 2                      00011090
              IF        (WORK,GT,ADLIM),GOTO,SLNTERR   TAKE ERROR EXIT             00011100
              MULT      FUDGE,WORK,RESULT=SPAD,PREC=SSD                            00011110
              DIVIDE    SPAD,100,RESULT=WORK,PREC=DSS                              00011120
              MOVE      STEP1I,0               ZERO STEPS FOR MOTOR #1 IN          00011130
              IF        (WORK,GT,2000)         DOES STEPS EXCEED LIMIT             00011140
              MOVE      STEP2O,2000            YES, SET #2 OUT TO MAX              00011150
              MOVE      STEPOUT,2000           SET STEPS OUT TO MAX                00011160
              SUB       WORK,2000,RESULT=STEP1I PUT REST #1 MOTOR IN               00011170
              MOVE      STEPIN,STEP1I          LOAD # OF STEPS IN                  00011180
              GOTO      SKP2                   SKIP STEP TO SET                    00011190
              ENDIF                                                                00011200
              MOVE      STEP2O,WORK            MOVE STEPS TO DO LOOP               00011210
              MOVE      STEPOUT,WORK           LOAD # OF STEPS OUT                 00011220
SKP2          MOVE      REFR,REF               SAVE X ADDRESS                      00011230
              CALL      REF2OUT                GO MOVE BEZEL                       00011240
              IF        (STEP1I,NE,0)          DO WE HAVE TO MOVE #1 IN            00011250
              CALL      REF1IN                 YES, GO MOVE IT                     00011260
              ENDIF                                                                00011270
              GOTO      DB1                    *** DEBUG ***                       00011280
              GOTO      PARALLEL                                                   00011290
DB1           EQU       *                                                          00011300
              DO        342                  D                                     00011310
              SBID      D014,1               F                                     00011320
              SBID      D014,0               B                                     00011330
              DO        120                  U                                     00011340
              MOVE      A,B                  G                                     00011350
              MOVE      B,A                                                        00011360
              ENDDO                          C                                     00011370
              ENDDO                            O                                   00011380
              MOVE      CARSTEP,342              D                                 00011390
              GOTO      STREF                      E                               00011400
                                                                                   00011420
*       AT THIS POINT THE BEZEL SHOULD BE PARALLEL TO REFERENCE EDGE AND           00011430
*       THE ADDRESS OF THE BEZEL WILL BE IN 'REFR'. WE NOW HAVE TO MOVE            00011440
*       THE BEZEL SO THAT IT IS LINED UP WITH THE ADDRESS CONTAINED IN             00011450
*       'SIDLIMIT'.                                                                00011460
*                                                                                  00011470
PARALLEL EQU  *                                                                    00011480
              SUB       SIDLIMIT,XSAVE,RESULT=REFR   GET DIFFERENCE                00011490
              IF        (REFR,GE,-5),AND,(REFR,LE,5),GOTO,CHKEDGE                  00011500

IF        (REFR,LT,0),GOTO,MOVEIN NEG. # GO MOVE OTHER WAY           00011510
```

Assembly Language Listing (Continued)

```
          IF        (STEPOUT,EQ,2000),GOTO,PARLERR   NOT ENOUGH ROOM          00011520
          MOVE      WORK,2000                SET WORK TO MAX                   00011530
          SUB       WORK,STEPOUT             GET DIFFERENCE                    00011540
          MULT      WORK,75,RESULT=SPAD,PREC=SSD   TAKE 75%                    00011550
          DIVIDE    SPAD,100,RESULT=WORK,PREC=DSS   GET %                      00011560
          MULT      WORK,100,RESULT=SPAD,PREC=SSD    DIVIDE BY DECIMAL         00011570
          DIVIDE    SPAD,FUDGE,RESULT=WORK,PREC=DSS  VALUE OF FUDGE            00011580
          PRINTEXT  '@MOVE 1 & 2 OUT '                                         00011590

PRINTNUM  SIDLIMIT,MODE=HEX                                          00011600
          PRINTNUM  XSAVE,MODE=HEX                                             00011610
          PRINTNUM  REFR,MODE=HEX                                              00011620
          PRINTNUM  WORK,MODE=HEX                                              00011630
          PRINTEXT  SKIP=1                                                     00011640
          MOVE      MTRNUM,21                MOTOR NUMBER 2 AND 1              00011650
          IF        (REFR,GT,WORK),GOTO,PARLERR  TOO BIG A MOVE NEEDED         00011660
          MOVE      STEP1O,REFR              MOVE STEPS TO #1 DO LOOP          00011670
          CALL      REF1OUT                  GO MOVE #1 REF. EDGE MOTOR OUT    00011680
          MOVE      STEP2O,REFR              MOVE STEPS TO #2 DO LOOP          00011690
          CALL      REF2OUT                  GO MOVE #2 REF. EDGE MOTOR OUT    00011700
          GOTO      CHKEDGE                  GO CHECK Y EDGE                   00011710
MOVEIN    EQU       *                                                          00011720
          SUB       XSAVE,SIDLIMIT,RESULT=REFR    GET DIFFERENCE               00011730
          IF        (STEPIN,EQ,0),GOTO,PARLERR    NOT ENOUGH ROOM              00011740
          MULT      STEPIN,20,RESULT=SPAD,PREC=SSD   GET 20%                   00011750
          DIVIDE    SPAD,100,RESULT=WORK,PREC=DSS   GET %                      00011760
          MULT      WORK,100,RESULT=SPAD,PREC=SSD    DIVIDE BY DECIMAL         00011770
          DIVIDE    SPAD,FUDGE,RESULT=WORK,PREC=DSS  VALUE IN FUDGE            00011780
          PRINTEXT  '@MOVE 1 & 2 IN  '                                         00011790

PRINTNUM  SIDLIMIT,MODE=HEX                                          00011800
          PRINTNUM  XSAVE,MODE=HEX                                             00011810
          PRINTNUM  REFR,MODE=HEX                                              00011820
          PRINTNUM  WORK,MODE=HEX                                              00011830
          PRINTEXT  SKIP=1                                                     00011840
          MOVE      MTRNUM,12                MOTOR NUMBER 1 AND 2              00011850
          IF        (REFR,GT,WORK),GOTO,PARLERR  TOO BIG A MOVE NEEDED         00011860
          MOVE      STEP1I,REFR              MOVE STEPS TO #1 DO LOOP          00011870
          CALL      REF1IN                   GO MOVE #1 REF. EDGE MOTOR IN     00011880
          MOVE      STEP2I,REFR              MOVE STEPS TO #2 DO LOOP          00011890
          CALL      REF2IN                   GO MOVE #2 REF. EDGE MOTOR IN     00011900
          GOTO      CHKEDGE                  GO CHECK Y EDGE                   00011910
*                                                                              00011930
*    THIS SECTION WILL RESET THE X AND Y ADDRESSES AND FIND THE                00011940
*    VERTICAL LINE WITH THE XFIND ROUTINE, AND FIND THE HORIZONTIAL            00011950
*    LINE WITH THE YFIND ROUTINE. THE YEDGE ROUTINE WILL FIND THE              00011960
*    EDGE OF THE HORIZONTIAL LINE IN THE Y DIRECTION AND REFERENCE             00011970
*    EDGE MOTOR #3 WILL MOVE THE BEZEL IN OR OUT TO LINE THE TOP OF            00011980
*    THE BEZEL WITH THE ADDRESS IN LOCATION 'TOPLIMIT'.                        00011990
*                                                                              00012000
CHKEDGE   EQU       *                                                          00012010
          GOTO      EOJ                      *** DEBUG ***                     00012020
          MOVE      CARSTEP,3                MOVE CARRIAGE                     00012030
          CALL      CARRRET                  MOVEIT                            00012040
          MOVE      CARSTEP,0                RESET STEPS                       00012050
          MOVE      XSAVE,XCONST             RESET X ADDRESS                   00012060
          MOVE      YSAVE,YCONSTY            INIT FOR Y LINE SEARCH            00012070
          CALL      XFIND                    GO FIND VERTICAL LINE             00012080
          IF        (CODE,NE,-1),GOTO,ERRORTN   TAKE ERROR EXIT                00012090
          CALL      YFIND                    GO FIND HORIZONTIAL LINE          00012100
          IF        (CODE,NE,-1),GOTO,ERRORTN   TAKE ERROR EXIT                00012110
          CALL      YEDGE                    GO FIND EDGE OF THE LINE          00012120
          IF        (CODE,NE,-1),GOTO,ERRORTN   TAKE ERROR EXIT                00012130
          MOVE      REFR,YADDR               SAVE ADDRESS                      00012140
          SUB       TOPLIMIT,REFR,RESULT=WORK   GET DIFFERENCE                 00012150
          PRINTEXT  '@Y - LIMIT, EDGE, DIFF = '                                00012160

PRINTNUM  TOPLIMIT,MODE=HEX                                          00012170
          PRINTNUM  REFR,MODE=HEX                                              00012180
          PRINTNUM  WORK,MODE=HEX                                              00012190
          PRINTEXT  SKIP=1                                                     00012200
          IF        (WORK,GE,-5),AND,(WORK,LE,5),GOTO,DONEREZ                  00012210
```

Assembly Language Listing (Continued)

```
            IF       (WORK,LT,0),GOTO,IN3   NEG. # GO OTHER WAY         00012220
            MOVE     MTRNUM,3               MOTOR NUMBER 3              00012230
            IF       (WORK,GT,ADLIM),GOTO,SLNTERR  TOO BIG A MOVE NEEDED 00012240
            MOVE     STEP30,WORK            MOVE STEPS TO #3 DO LOOP    00012250
            CALL     REF3OUT                GO MOVE #3 REF. EDGE MOTOR OUT 00012260
            GOTO     DONEBEZ                DONE BEZEL MOVE             00012270
IN3         EQU      *                                                  00012280
            SUB      REFR,TOPLIMIT,RESULT=WORK   GET DIFFERENCE         00012290
            MOVE     MTRNUM,3               MOTOR NUMBER 3              00012300
            IF       (WORK,GT,ADLIM),GOTO,SLNTERR  TOO BIG A MOVE NEEDED 00012310
            MOVE     STEP3I,WORK            MOVE STEPS TO #3 DO LOOP    00012320
            CALL     REF3IN                 GO MOVE #3 REF. EDGE MOTOR IN 00012330
DONEBEZ     EQU      *                                                  00012340
            DO       3                                                  00012350
            SBIO     DO14,1                 MOVE CARRIAGE FORWARD       00012360
            SBIO     DO14,0                 FROM 2ND ROW TO 3RD ROW     00012370
            DO       120                                                00012380
            MOVE     A,B                    WAIT FOR CARRIAGE TO MOVE   00012390
            MOVE     B,A                                                00012400
            ENDDO                                                       00012410
            ENDDO                                                       00012420
            PRINTEXT '@BEZEL HAS BEEN ADJUSTED @'                       00012430

IF       (FOCSW,EQ,1),GOTO,EOJ                              00012440

*    PRINT DATA FROM ALL THREE BUFFERS                                  00012460
PRINT       EQU      *                                                  00012470
            MOVE     $1,0                   ZERO INDEX REG              00012480
            MOVE     VINCE,1                INITIALIZE POSITION COUNTER 00012490
            ENQT     $SYSPRTR                                           00012500
            PRINTEXT 'TARGET FOCUS AND SUMMARY DATA',LINE=0,SPACES=10   00012510

PRINTEXT '@@    DATE = '        PRINT                       00012520

PRINDATE                        DATE                        00012530
            PRINTEXT 'TIME = ',SPACES=10                AND             00012540

PRINTIME                                    TIME            00012550
            PRINTEXT SKIP=2                                             00012560
            PRINTEXT TEXT3                                              00012570
            PRINTEXT SKIP=1                                             00012580
            DO       21                     PRINT LOOP 21 POSITIONS     00012590
            PRINTEXT SKIP=1                 SKIP TO NEW LINE            00012600
            PRINTNUM VINCE                  PRINT POSITION NUMBER       00012610
            PRINTNUM (BUFF1,$1),SPACES=4    PRINT TARGET 1 VALUE        00012620

IF       (COMP1,EQ,(BUFF1,$1))  IS DATA EQUAL TO LOW?       00012630
            MOVE     TGLOW,ASTER            FLAG IT WITH ASTERISK       00012640
            ELSE                                                        00012650
            MOVE     TGLOW,BLANK            ELSE MOVE IN BLANK          00012660
            ENDIF                                                       00012670
            PRINTEXT TGLOW                  PRINT IT                    00012680
            PRINTNUM (BUFF2,$1),SPACES=2    PRINT TARGET 2 VALUE        00012690

IF       (COMP2,EQ,(BUFF2,$1))  IS DATA EQUAL TO LOW?       00012700
            MOVE     TGLOW,ASTER            FLAG IT WITH ASTERISK       00012710
            ELSE                                                        00012720
            MOVE     TGLOW,BLANK            ELSE MOVE IN BLANK          00012730
            ENDIF                                                       00012740
            PRINTEXT TGLOW                  PRINT IT                    00012750
            PRINTNUM (BUFF3,$1),SPACES=2    PRINT TARGET 3 VALUE        00012760

IF       (COMP3,EQ,(BUFF3,$1))  IS DATA EQUAL TO LOW?       00012770
            MOVE     TGLOW,ASTER            FLAG IT WITH ASTERISK       00012780
            ELSE                                                        00012790
            MOVE     TGLOW,BLANK            ELSE MOVE IN BLANK          00012800
            ENDIF                                                       00012810
            PRINTEXT TGLOW                  PRINT IT                    00012820
            PRINTNUM (BUFF4,$1),SPACES=2    PRINT TARGET 4 VALUE        00012830
```

Assembly Language Listing (Continued)

```
        IF        (COMP4,EQ,(BUFF4,#1)) IS DATA EQUAL TO LOW?      00012840
        MOVE      TGLOW,ASTER         FLAG IT WITH ASTERISK        00012850
        ELSE                                                       00012860
        MOVE      TGLOW,BLANK         ELSE MOVE IN BLANK           00012870
        ENDIF                                                      00012880
        PRINTEXT  TGLOW               PRINT IT                     00012890
        PRINTNUM  (BUFF5,#1),SPACES=2 PRINT TARGET 5 VALUE         00012900

IF        (COMP5,EQ,(BUFF5,#1)) IS DATA EQUAL TO LOW?      00012910
        MOVE      TGLOW,ASTER         FLAG IT WITH ASTERISK        00012920
        ELSE                                                       00012930

MOVE      TGLOW,BLANK         ELSE MOVE IN BLANK           00012940
        ENDIF                                                      00012950
        PRINTEXT  TGLOW               PRINT IT                     00012960
        PRINTNUM  (BUFF6,#1),SPACES=2 PRINT TARGET 6 VALUE         00012970

IF        (COMP6,EQ,(BUFF6,#1)) IS DATA EQUAL TO LOW?      00012980
        MOVE      TGLOW,ASTER         FLAG IT WITH ASTERISK        00012990
        ELSE                                                       00013000
        MOVE      TGLOW,BLANK         ELSE MOVE IN BLANK           00013010
        ENDIF                                                      00013020
        PRINTEXT  TGLOW               PRINT IT                     00013030
        PRINTNUM  (BUFF7,#1),SPACES=2 PRINT TARGET 7 VALUE         00013040

IF        (COMP7,EQ,(BUFF7,#1)) IS DATA EQUAL TO LOW?      00013050
        MOVE      TGLOW,ASTER         FLAG IT WITH ASTERISK        00013060
        ELSE                                                       00013070
        MOVE      TGLOW,BLANK         ELSE MOVE IN BLANK           00013080
        ENDIF                                                      00013090
        PRINTEXT  TGLOW               PRINT IT                     00013100
        PRINTNUM  (BUFF8,#1),SPACES=2 PRINT TARGET 8 VALUE         00013110

IF        (COMP8,EQ,(BUFF8,#1)) IS DATA EQUAL TO LOW?      00013120
        MOVE      TGLOW,ASTER         FLAG IT WITH ASTERISK        00013130
        ELSE                                                       00013140
        MOVE      TGLOW,BLANK         ELSE MOVE IN BLANK           00013150
        ENDIF                                                      00013160
        PRINTEXT  TGLOW               PRINT IT                     00013170
        PRINTNUM  (BUFF9,#1),SPACES=2 PRINT TARGET 9 VALUE         00013180

IF        (COMP9,EQ,(BUFF9,#1)) IS DATA EQUAL TO LOW?      00013190
        MOVE      TGLOW,ASTER         FLAG IT WITH ASTERISK        00013200
        ELSE                                                       00013210
        MOVE      TGLOW,BLANK         ELSE MOVE IN BLANK           00013220
        ENDIF                                                      00013230
        PRINTEXT  TGLOW               PRINT IT                     00013240
        IF        (VINCE,EQ,REFF)                                  00013250
        PRINTEXT  ' BEST FOCUS POINT '                             00013260

ENDIF                                                      00013270
        ADD       #1,2                ADD 2 TO INDEX REG           00013280
        ADD       VINCE,1             ADD 1 TO POSITION            00013290
        ENDDO                                                      00013300
*       PRINTEXT  '@ XADDR',SKIP=2                                 00013310
*       PRINTNUM  XADD1,9,9,7,MODE=HEX  PRINT START ADDR FOR TARGETS 00013320
        PRINTEXT  '@COUNT = ',SKIP=4                               00013330

PRINTNUM  REFD                                             00013340
        PRINTEXT  DISTEXT             PRINT DISTANCE MSG.          00013350
        DEQT                                                       00013360
        GOTO      EOJ                 GET OUT                      00013370

* PRINT ERROR MESSAGES AND END OF JOB EXIT                         00013390
ERRORTN EQU       *                                                00013400
        IF        (RTNSW,GE,4)        >= 4 Y ROUTINE BAD           00013410
        MOVE      TEXT+2,YB           MOVE "Y " TO MSG             00013420
        SUB       RTNSW,3             REDUCE SWITCH VALUE TO 1,2, OR 3 00013430
        ELSE                                                       00013440
        MOVE      TEXT+2,XB           MOVE "X " TO MSG             00013450
        ENDIF                                                      00013460
        IF        (RTNSW,EQ,1)        PRINT ROUTINE &              00013470
        MOVE      TEXT+4,FINDT,2        TARGET IDENT               00013480
```

Assembly Language Listing (Continued)

```
                GOTO      FTEXT                                                 00013490
                ENDIF                                                           00013500
                IF        (RTNSW,EQ,2)                                          00013510
                MOVE      TEXT+4,SCANT,2                                        00013520
                ELSE                                                            00013530
                MOVE      TEXT+4,EDGET,2                                        00013540
                ENDIF                                                           00013550
       FTEXT    PRINTEXT  TEXT                                                  00013560
                PRINTNUM  TARGET                                                00013570
                IF        (CODE,EQ,1),GOTO,FINDERR  COULD NOT FIND TARGET       00013580
                IF        (CODE,EQ,2),GOTO,LINERR   VIDEO NOT UP TO LEVEL       00013590
                PRINTEXT  ' UNDEFINED ERROR, CODE = '                           00013600

PRINTNUM  CODE                                                  00013610
                GOTO      ERREOJ                                                00013620
       FINDERR  EQU       *                                                     00013630
                PRINTEXT  ' COULD NOT FIND TARGET @'    PRINT ERROR MSG         00013640

GOTO      ERREOJ                                                00013650
       LINERR   EQU       *                                                     00013660
                PRINTEXT  ' VIDEO NOT AT VALID LEVEL@'  PRINT ERROR MSG         00013670

GOTO      ERREOJ                                                00013680
       NOFOC    EQU       *                                                     00013690
                PRINTEXT  '@NO FOCUS POINT FOUND ON TARGET '                    00013700
                PRINTNUM  TARGET                                                00013710
                PRINTEXT  SKIP=1                                                00013720
                GOTO      ERREOJ                                                00013730
       DISKERR  EQU       *                                                     00013740
                PRINTEXT  '@DISK WRITE ERROR @'  PRINT ERROR MESSAGE            00013750

GOTO      ERREOJ                                                00013760
       LIMITERR EQU       *                                                     00013770
                IF        (LIMIT,EQ,2)        TEST FOR BACK SWITCH              00013780
                MOVE      TEXT2+30,BACK,4     MOVE BACKWARD TO MESSAGE          00013790
                ELSE                                                            00013800
                MOVE      TEXT2+30,FORE,4     MOVE FORWARD TO MESSAGE           00013810
                ENDIF                                                           00013820
                PRINTEXT  TEXT2               PRINT ERROR MESSAGE               00013830
                GOTO      EOJ                                                   00013840
       CLIMERR  EQU       *                                                     00013850
                PRINTEXT  '@CAMERA HIT RIGHT LIMIT @'                           00013860

GOTO      EOJ                                                   00013870
       CAMHOME  EQU       *                                                     00013880
                PRINTEXT  '@CAMERA AT HOME EDGE @'                              00013890

GOTO      EOJ                                                   00013900
       SLNTERR  EQU       *                                                     00013910
                PRINTEXT  '@BEZEL MOVE TOO LARGE FOR MOTOR NUMBER '             00013920
                PRINTNUM  MTRNUM                                                00013930
                PRINTEXT  SKIP=1                                                00013940
                GOTO      EOJ                                                   00013950
       FARLERR  EQU       *                                                     00013960
                PRINTEXT  '@NOT ENOUGH ROOM TO MOVE BEZEL TO REFERENCE EDGE@'   00013970

GOTO      EOJ                                                   00013980
       ERREOJ   EQU       *                                                     00013990
                IF        (BKSTEPS,EQ,0),GOTO,EOJ  AT LEFT TARGET, GET OUT      00014000
                CALL      GOHOME              CALL SUBROUT TO MOVE CAMERA HOME  00014010
                GOTO      EOJ                                                   00014020
       EOJ      EQU       *                                                     00014030
                IF        (CAMSTEP,EQ,0),GOTO,FRGSTP                            00014040
                CALL      CAMRET                                                00014050
       FRGSTP   FROGSTOP                                                        00014060

*    START OF XFIND SUBROUTINE                                           00014080
                SUBROUT   XFIND                                                 00014090
```

Assembly Language Listing (Continued)

```
               MOVE     XADDR,XSAVE         LOAD X ADDRESS                       00014100
               MOVE     YADDR,YSAVE         LOAD Y ADDRESS                       00014110
               MOVE     RTNSW,1             SET ROUTINE SW=1, X FIND ROUTINE     00014120
               CALL     READER              READ TO CLEAR SCANNER                00014130
    FINDAVG    MOVE     AVG,0               ZERO AVERAGE FIELD                   00014140
               DO       10                  TAKE 10 READINGS                     00014150
               CALL     READER              GO READ SPOT                         00014160
               ADD      AVG,READING         ADD READING                          00014170
               ADD      XADDR,1             ADD 1 TO READING                     00014180
               ENDDO                                                             00014190
               SUB      XADDR,10            RESET X ADDR                         00014200
               DIVIDE   AVG,10              GET THE AVERAGE                      00014210
               IF       (AVG,LT,256)        VIDEO SIGNAL TO LOW                  00014220
               MOVE     CODE,2              SET CODE, BAD VIDEO LEVEL            00014230
               RETURN                                                            00014240
               ENDIF                                                             00014250
               IF       (AVG,LT,256)        LEVEL BELOW 256                      00014260
               SUB      XADDR,200           TRY TO BACK OUT TARGET AREA          00014270
               IF       (XADDR,LT,LOLIMIT)  CHECK LOW ADDR                       00014280
               MOVE     CODE,1              SET CODE, COULD NOT FIND TARGET      00014290
               RETURN                                                            00014300
               ENDIF                                                             00014310
               GOTO     FINDAVG             GO TRY AGAIN TO GET AVG              00014320
               ENDIF                                                             00014330
               MOVE     HILEV,AVG           MOVE AVG TO MOVE INSTRUCTION         00014340
               MULT     HILEV,80,RESULT=SPAD,PREC=SSD  GET 80%                   00014350
               DIVIDE   SPAD,100,RESULT=HILEV,PREC=DSS                           00014360
               GOTO     XADD20              GO START SCAN                        00014370
    XCRREAD    EQU      *                                                        00014380
               CALL     READER                                                   00014390
               IF       (READING,LT,HILEV),GOTO,XBACKOFF                         00014400
    XADD20     EQU      *                                                        00014410
               ADD      XADDR,10            ADD 10 TO X ADDRESS                  00014420
               IF       (XADDR,LT,HILIMIT),GOTO,XCRREAD                          00014430
               MOVE     CODE,1              SET CODE COULDN'T FIND TARGET        00014440
               RETURN                                                            00014450
    XBACKOFF   EQU      *                                                        00014460
               SUB      XADDR,50            BACK OFF LINE                        00014470
               MOVE     XSAVE,XADDR         SAVE X ADDR                          00014480
               MOVE     AVG,0               ZERO AVERAGE FIELD                   00014490
               DO       10                  TAKE 10 READINGS                     00014500
               CALL     READER              GO READ SPOT                         00014510
               ADD      AVG,READING         ADD READING                          00014520
               ADD      XADDR,1             ADD 1 TO READING                     00014530
               ENDDO                                                             00014540
               SUB      XADDR,10            RESET X ADDR                         00014550
               DIVIDE   AVG,10              GET THE AVERAGE                      00014560
               MOVE     HILEV,AVG           MOVE AVG TO MOVE INSTRUCTION         00014570
               MULT     HILEV,80,RESULT=SPAD,PREC=SSD  GET 80%                   00014580
               DIVIDE   SPAD,100,RESULT=HILEV,PREC=DSS                           00014590
               MOVE     FIRSTSW,0           ZERO THE FIRST TIME SWITCH           00014600
               MOVE     CODE,-1             SET CODE GOOD RETURN                 00014610
               RETURN                                                            00014620

*   START OF YFIND SUBROUTINE                                                 00014640
               SUBROUT  YFIND                                                    00014650
               MOVE     XADDR,XSAVE         LOAD X ADDRESS                       00014660
               MOVE     YADDR,YSAVE         LOAD Y ADDRESS                       00014670
               MOVE     RTNSW,4             SET ROUTINE SW=4, Y FIND ROUTINE     00014680
               CALL     READER              READ TO CLEAR SCANNER                00014690
    FNDAVGY    MOVE     AVG,0               ZERO AVERAGE FIELD                   00014700
               DO       10                  TAKE 10 READINGS                     00014710
               CALL     READER              GO READ SPOT                         00014720
               ADD      AVG,READING         ADD READING                          00014730
               ADD      YADDR,1             ADD 1 TO READING                     00014740
               ENDDO                                                             00014750
               SUB      YADDR,10            RESET Y ADDR                         00014760
               DIVIDE   AVG,10              GET THE AVERAGE                      00014770
               IF       (AVG,LT,256)        VIDEO SIGNAL TO LOW                  00014780
               MOVE     CODE,2              SET CODE, BAD VIDEO LEVEL            00014790
               RETURN                                                            00014800
               ENDIF                                                             00014810
               IF       (AVG,LT,256)        LEVEL BELOW 256                      00014820
```

Assembly Language Listing (Continued)

```
            SUB       YADDR,200              TRY TO BACK OUT TARGET AREA    00014830
            IF        (YADDR,GT,HILIMIT)     CHECK HIGH ADDR                00014840
            MOVE      CODE,1                 SET CODE, COULD NOT FIND TARGET 00014850
            RETURN                                                          00014860
            ENDIF                                                           00014870
            GOTO      FNDAVGY                GO TRY AGAIN TO GET AVG        00014880
            ENDIF                                                           00014890
            MOVE      HILEV,AVG              MOVE AVG TO MOVE INSTRUCTION   00014900
            MULT      HILEV,80,RESULT=SPAD,PREC=SSD  GET 80%                00014910
            DIVIDE    SPAD,100,RESULT=HILEV,PREC=DSS                        00014920
            GOTO      YADD20                 GO START SCAN                  00014930
YCRREAD     EQU       *                                                     00014940
            CALL      READER                                                00014950
            IF        (READING,LT,HILEV),GOTO,YBACKOFF                      00014960
YADD20      EQU       *                                                     00014970
            ADD       YADDR,10               ADD 10 TO Y ADDRESS            00014980
            IF        (YADDR,GT,LOLIMIT),GOTO,YCRREAD                       00014990
            MOVE      CODE,1                 SET CODE COULDN'T FIND TARGET  00015000
            RETURN                                                          00015010
YBACKOFF    EQU       *                                                     00015020
            SUB       YADDR,50               BACK OFF LINE                  00015030
            MOVE      YSAVE,YADDR            SAVE Y ADDR                    00015040
            MOVE      AVG,0                  ZERO AVERAGE FIELD             00015050
            DO        10                     TAKE 10 READINGS               00015060
            CALL      READER                 GO READ SPOT                   00015070
            ADD       AVG,READING            ADD READING                    00015080
            ADD       YADDR,1                ADD 1 TO READING               00015090
            ENDDO                                                           00015100
            SUB       YADDR,10               RESET Y ADDR                   00015110
            DIVIDE    AVG,10                 GET THE AVERAGE                00015120
            MOVE      HILEV,AVG              MOVE AVG TO MOVE INSTRUCTION   00015130
            MULT      HILEV,80,RESULT=SPAD,PREC=SSD  GET 80%                00015140
            DIVIDE    SPAD,100,RESULT=HILEV,PREC=DSS                        00015150
            MOVE      FIRSTSW,0              ZERO THE FIRST TIME SWITCH     00015160
            MOVE      CODE,-1                SET CODE GOOD RETURN           00015170
            RETURN                                                          00015180
*   X FOCUS SECTION                                                         00015200
            SUBROUT   XSCAN                                                 00015210
            MOVE      XADDR,XSAVE            RESTORE X ADDR                 00015220
            MOVE      RTNSW,2                SET ROUTINE SW=2, X SCAN ROUTINE 00015230
            MOVE      RDCOMP,HILEV           RESET READING COMPARE TO HIGH  00015240
            MOVE      PUSH,0,8,P2=AVG        MOVE AVG VIDEO TO PUSH STACK   00015250
            MOVE      LOOPCNT,0              ZERO LOOP COUNTER              00015260
            MOVE      SCANEND,SCANLEN        MOVE IN SCAN LENGTH            00015270
            ADD       SCANEND,XSAVE          ADD SCAN START ADDR            00015280
            CALL      READER                 READ TO CLEAR SCANNER          00015290
XFNREAD     EQU       *                                                     00015300
            CALL      READER                 GO READ POINT                  00015310
            MOVE      PUSH,PUSH+2,7          PUSH DATA UP IN STACK          00015320
            MOVE      PUSH+14,READING        PUT READING IN STACK           00015330
            ADD       READING,PUSH           ADD STACK TO READING           00015340
            ADD       READING,PUSH+2                                        00015350
            ADD       READING,PUSH+4                                        00015360
            ADD       READING,PUSH+6                                        00015370
            ADD       READING,PUSH+8                                        00015380
            ADD       READING,PUSH+10                                       00015390
            ADD       READING,PUSH+12                                       00015400
            DIVIDE    READING,8              GET AVERAGE                    00015410
            IF        (READING,GT,HILEV)     IF READING IS GREATER THEN HIGH 00015420
            ADD       XADDR,2                ADD 2 TO X ADDR                00015430
            IF        (XADDR,GT,SCANEND)                                    00015440
            MOVE      CODE,1                 SET CODE = 1, COULD NOT FIND   00015450
            RETURN                                                          00015460
            ENDIF                                                           00015470
            IF        (SWITCH,EQ,1)          ON UPSLOPE GET OUT             00015480
            ADD       LOOPCNT,1              ADD 1 TO LOOP COUNTER          00015490
            IF        (LOOPCNT,LT,5),GOTO,XFNREAD  5 TRIES TO GET LOWER     00015500
            GOTO      CHKXFOC                UPSLOPE GET OUT                00015510
            ENDIF                                                           00015520
            GOTO      XFNREAD                GO TAKE NEXT READING           00015530
            ENDIF                                                           00015540
            IF        (READING,LT,RDCOMP)    IF READING LESS THAN COMPARE   00015550
            MOVE      RDCOMP,READING         SAVE READING                   00015560
            MOVE      LOOPCNT,0              ZERO LOOP COUNT                00015570
```

Assembly Language Listing (Continued)

```
            MOVE      SWITCH,1              SET READING SWITCH               00015580
            ENDIF                                                            00015590
            ADD       XADDR,2               ADD 2 TO X ADDR                  00015600
            IF        (XADDR,GT,SCANEND)    HAVE WE EXCEEDED X SCAN LIMIT?   00015610
            MOVE      CODE,1                SET CODE = 1,COULDN'T FIND LINE  00015620
            RETURN                                                           00015630
            ENDIF                                                            00015640
            IF        (SWITCH,EQ,1)         ON UPSLOPE GET OUT               00015650
            ADD       LOOPCNT,1             ADD 1 TO LOOP COUNTER            00015660
            IF        (LOOPCNT,LE,5),GOTO,XFNREAD  5 TRIES TO GET LOWER      00015670
            GOTO      CHKXFOC               UPSLOPE GET OUT                  00015680
            ENDIF                                                            00015690
            GOTO      XFNREAD               GO READ NEXT POINT               00015700
CHKXFOC     EQU       *                                                      00015710
            MOVE      VALUE,RDCOMP          LOW READING TO VALUE             00015720
            MOVE      SWITCH,0              RESET SWITCH                     00015730
            MOVE      CODE,-1               SET RETURN CODE -1, GOOD         00015740
            RETURN                                                           00015750

* Y FOCUS SECTION                                                            00015770
            SUBROUT   YSCAN                                                  00015780
            MOVE      YADDR,YSAVE           RESTORE Y ADDR                   00015790
            MOVE      RTNSW,5               SET ROUTINE SW=5, Y SCAN ROUTINE 00015800
            MOVE      RDCOMP,HILEV          RESET READING COMPARE TO HIGH    00015810
            MOVE      AVGY,AVG              MOVE AVG TO MOVE INSTRUCTION     00015820
            MOVE      PUSH,0,8,P2=AVGY      MOVE AVG VIDEO TO PUSH STACK     00015830
            MOVE      LOOPCNT,0             ZERO LOOP COUNTER                00015840
            MOVE      SCANEND,SCANLEN       MOVE IN SCAN LENGTH              00015850
            ADD       SCANEND,YSAVE         ADD SCAN START ADDR              00015860
            CALL      READER                READ TO CLEAR SCANNER            00015870
YFNREAD     EQU       *                                                      00015880
            CALL      READER                GO READ POINT                    00015890
            MOVE      PUSH,PUSH+2,7         PUSH DATA UP IN STACK            00015900
            MOVE      PUSH+14,READING       PUT READING IN STACK             00015910
            ADD       READING,PUSH          ADD STACK TO READING             00015920
            ADD       READING,PUSH+2                                         00015930
            ADD       READING,PUSH+4                                         00015940
            ADD       READING,PUSH+6                                         00015950
            ADD       READING,PUSH+8                                         00015960
            ADD       READING,PUSH+10                                        00015970
            ADD       READING,PUSH+12                                        00015980
            DIVIDE    READING,8             GET AVERAGE                      00015990
            IF        (READING,GT,HILEV)    IF READING IS GREATER THEN HIGH  00016000
            ADD       YADDR,2               ADD 2 TO Y ADDR                  00016010
            IF        (YADDR,GT,SCANEND)                                     00016020
            MOVE      CODE,1                SET CODE = 1, COULD NOT FIND     00016030
            RETURN                                                           00016040
            ENDIF                                                            00016050
            IF        (SWITCH,EQ,1)         ON UPSLOPE GET OUT               00016060
            ADD       LOOPCNT,1             ADD 1 TO LOOP COUNTER            00016070
            IF        (LOOPCNT,LT,5),GOTO,YFNREAD  5 TRIES TO GET LOWER      00016080
            GOTO      CHKYFOC               UPSLOPE GET OUT                  00016090
            ENDIF                                                            00016100
            GOTO      YFNREAD               GO TAKE NEXT READING             00016110
            ENDIF                                                            00016120
            IF        (READING,LT,RDCOMP)   IF READING LESS THAN COMPARE     00016130
            MOVE      RDCOMP,READING        SAVE READING                     00016140
            MOVE      LOOPCNT,0             ZERO LOOP COUNT                  00016150
            MOVE      SWITCH,1              SET READING SWITCH               00016160
            ENDIF                                                            00016170
            ADD       YADDR,2               ADD 2 TO Y ADDR                  00016180
            IF        (YADDR,GT,SCANEND)    HAVE WE EXCEEDED Y SCAN LIMIT?   00016190
            MOVE      CODE,1                SET CODE = 1,COULDN'T FIND LINE  00016200
            RETURN                                                           00016210
            ENDIF                                                            00016220
            IF        (SWITCH,EQ,1)         ON UPSLOPE GET OUT               00016230
            ADD       LOOPCNT,1             ADD 1 TO LOOP COUNTER            00016240
            IF        (LOOPCNT,LE,5),GOTO,XFNREAD  5 TRIES TO GET LOWER      00016250
            GOTO      CHKYFOC               UPSLOPE GET OUT                  00016260
            ENDIF                                                            00016270
            GOTO      YFNREAD               GO READ NEXT POINT               00016280
CHKYFOC     EQU       *                                                      00016290
            MOVE      VALUE,RDCOMP          LOW READING TO VALUE             00016300
            MOVE      SWITCH,0              RESET SWITCH                     00016310
```

Assembly Language Listing (Continued)

```
                MOVE      CODE,-1                SET RETURN CODE -1, GOOD         00016320
                RETURN                                                            00016330

SUBROUT   XEDGE                                                   00016350
                MOVE      XADDR,XSAVE            RESTORE X ADDR                   00016360
                MOVE      RTNSW,3                SET ROUTINE SW=3, X EDGE ROUTINE 00016370
                MOVE      AVGD,AVG               MOVE AVERAGE TO COMMAND          00016380
                MOVE      RDCOMP,0               ZERO READ COMPARE                00016390
                MOVE      PUSH,0,8,P2=AVGD       MOVE AVERAGE TO PUSH STACK       00016400
    EDGELP      EQU       *                                                       00016410
                CALL      READER                 GO READ SPOT                     00016420
                IF        (READING,GT,HILEV)     IT'S READING ABOVE 80% LEVEL?    00016430
                ADD       XADDR,1                YES, ADD 1 TO X ADDRESS          00016440
                IF        (XADDR,LT,HILIMIT),GOTO,EDGELP NEXT POINT                00016450
                MOVE      CODE,1                 SET CODE COULD NOT FIND TARGET   00016460
                RETURN                                                            00016470
                ENDIF                                                             00016480
                MOVE      PUSH,PUSH+2,7          PUSH DATA UP STACK               00016490
                MOVE      PUSH+14,READING        PUT READING IN STACK             00016500
                MOVE      WORK,PUSH              MOVE DATA TO WORK AREA           00016510
                ADD       WORK,PUSH+2            ADD STACK TO READING             00016520
                ADD       WORK,PUSH+4                                             00016530
                ADD       WORK,PUSH+6                                             00016540
                MOVE      VALUE,PUSH+8           ADD OTHER HALF OF STACK          00016550
                ADD       VALUE,PUSH+10                                           00016560
                ADD       VALUE,PUSH+12                                           00016570
                ADD       VALUE,PUSH+14                                           00016580
                SUB       WORK,VALUE             GET DIFFERENCE                   00016590
                IF        (RDCOMP,LE,WORK)       HAVE WE REACHED EDGE?            00016600
                ADD       XADDR,1                NO, ADD 1 TO X ADDR              00016610
                MOVE      RDCOMP,WORK            SAVE NEW VALUE                   00016620
                IF        (XADDR,LT,HILIMIT),GOTO,EDGELP NEXT POINT                00016630
                MOVE      CODE,1                 SET CODE COULD NOT FIND TARGET   00016640
                RETURN                                                            00016650
                ENDIF                                                             00016660
                SUB       XADDR,4                SUBTRACT 4 TO GET EDGE           00016670
                MOVE      CODE,-1                SET CODE GOOD FINISH             00016680
                RETURN                                                            00016690

SUBROUT   YEDGE                                                   00016710
                MOVE      YADDR,YSAVE            RESTORE Y ADDR                   00016720
                MOVE      RTNSW,6                SET ROUTINE SW=6, Y EDGE ROUTINE 00016730
                MOVE      AVGDY,AVG              MOVE AVERAGE TO COMMAND          00016740
                MOVE      RDCOMP,0               ZERO READ COMPARE                00016750
                MOVE      PUSH,0,8,P2=AVGDY      MOVE AVERAGE TO PUSH STACK       00016760
    YEDGELP     EQU       *                                                       00016770
                CALL      READER                 GO READ SPOT                     00016780
                IF        (READING,GT,HILEV)     IS READING ABOVE 80% LEVEL?      00016790
                ADD       YADDR,1                YES, ADD 1 TO Y ADDRESS          00016800
                IF        (YADDR,LT,HILIMIT),GOTO,YEDGELP NEXT POINT               00016810
                MOVE      CODE,1                 SET CODE COULD NOT FIND TARGET   00016820
                RETURN                                                            00016830
                ENDIF                                                             00016840
                MOVE      PUSH,PUSH+2,7          PUSH DATA UP STACK               00016850
                MOVE      PUSH+14,READING        PUT READING IN STACK             00016860
                MOVE      WORK,PUSH              MOVE DATA TO WORK AREA           00016870
                ADD       WORK,PUSH+2            ADD STACK TO READING             00016880
                ADD       WORK,PUSH+4                                             00016890
                ADD       WORK,PUSH+6                                             00016900
                MOVE      VALUE,PUSH+8           ADD OTHER HALF OF STACK          00016910
                ADD       VALUE,PUSH+10                                           00016920
                ADD       VALUE,PUSH+12                                           00016930
                ADD       VALUE,PUSH+14                                           00016940
                SUB       WORK,VALUE             GET DIFFERENCE                   00016950
                IF        (RDCOMP,LE,WORK)       HAVE WE REACHED EDGE?            00016960
                ADD       YADDR,1                NO, ADD 1 TO Y ADDR              00016970
                MOVE      RDCOMP,WORK            SAVE NEW VALUE                   00016980
                IF        (YADDR,LT,HILIMIT),GOTO,YEDGELP NEXT POINT               00016990
                MOVE      CODE,1                 SET CODE COULD NOT FIND TARGET   00017000
                RETURN                                                            00017010
                ENDIF                                                             00017020
                SUB       YADDR,4                SUB 4 TO GET EDGE                00017030
                MOVE      CODE,-1                SET CODE GOOD FINISH             00017040
                RETURN                                                            00017050
```

Assembly Language Listing (Continued)

```
*        SUBROUTINE TO MOVE 2ND CARRIAGE FORWARD                         00017070
         SUBROUT    CARFORE                                              00017080
         DO         100                                                  00017090
         SBIO       DO12,1           MOVE CARRIAGE                       00017100
         SBIO       DO12,0           FORWARD                             00017110
         DO         10                                                   00017120
         MOVE       A,B              WAIT FOR CARRIAGE TO MOVE           00017130
         MOVE       B,A                                                  00017140
         ENDDO                                                           00017150
         SBIO       DI11,LIMIT       READ LIMIT SWITCHES                 00017160
         IF         (LIMIT,NE,0),GOTO,LIMITERR CARRIAGE EXCEEDED TRAVEL  00017170
         ENDDO                                                           00017180
         STIMER     200,WAIT,P1=CFTIME   PAUSE AFTER MOVE                00017190
         RETURN                                                          00017200
*                                                                        00017210
*                                                                        00017220
*        SUBROUTINE TO MOVE 2ND CARRIAGE BACKWARD                        00017230
*                                                                        00017240
*                                                                        00017250
         SUBROUT    CARBACK                                              00017260
         DO         100                                                  00017270
         SBIO       DO13,1           MOVE CARRIAGE                       00017280
         SBIO       DO13,0           BACKWARD                            00017290
         DO         10                                                   00017300
         MOVE       A,B              WAIT FOR CARRIAGE TO MOVE           00017310
         MOVE       B,A                                                  00017320
         ENDDO                                                           00017330
         SBIO       DI11,LIMIT       READ LIMIT SWITCHES                 00017340
         IF         (LIMIT,NE,0),GOTO,LIMITERR CARRIAGE EXCEEDED TRAVEL  00017350
         ENDDO                                                           00017360
         STIMER     200,WAIT,P1=CFTIME   PAUSE AFTER MOVE                00017370
         RETURN                                                          00017380
*                                                                        00017390
*                                                                        00017400
*        SUBROUTINE TO MOVE WHOLE CARRIAGE TO 1ST ROW                    00017410
*                                                                        00017420
*                                                                        00017430
         SUBROUT    CARRRET          MOVE CARRIAGE HOME                  00017440
         DO         0,P1=CARSTEP                                         00017450
         SBIO       DO15,1           MOVE CARRIAGE TO 1ST ROW            00017460
         SBIO       DO15,0                                               00017470
         DO         120                                                  00017480
         MOVE       A,B              WAIT FOR CARRIAGE TO MOVE           00017490
         MOVE       B,A                                                  00017500
         ENDDO                                                           00017510
         ENDDO                                                           00017520
         MOVE       CARSTEP,0        ZERO STEPS                          00017530
         MOVE       CODE,-1          SET CODE GOOD RETURN                00017540
         RETURN                                                          00017550
         SUBROUTINE TO MOVE REFERENCE EDGE MOTOR #1 IN                   00017570
         SUBROUT    REF1IN                                               00017580
         DO         1,P1=STEP1I                                          00017590
         SBIO       DO20,1           MOVE REFERENCE EDGE IN              00017600
         SBIO       DO20,0                                               00017610
         DO         6                                                    00017620
         MOVE       A,B              WAIT FOR BEZEL TO MOVE              00017630
         MOVE       B,A                                                  00017640
         ENDDO                                                           00017650
         SBIO       DI20,LIMIT       READ LIMIT SWITCHES                 00017660
         IF         (LIMIT,NE,0),GOTO,LIMITERR BEZEL EXCEEDED TRAVEL     00017670
         ENDDO                                                           00017680
         STIMER     200,WAIT         PAUSE AFTER MOVE                    00017690
         RETURN                                                          00017700
*                                                                        00017710
*                                                                        00017720
*        SUBROUTINE TO MOVE REFERENCE EDGE MOTOR #1 OUT                  00017730
*                                                                        00017740
*                                                                        00017750
         SUBROUT    REF1OUT                                              00017760
         DO         1,P1=STEP1O                                          00017770
         SBIO       DO21,1           MOVE REFERENCE EDGE OUT             00017780
         SBIO       DO21,0                                               00017790
         DO         6                                                    00017800
         MOVE       A,B              WAIT FOR BEZEL TO MOVE              00017810
```

Assembly Language Listing (Continued)

```
        MOVE       B,A                                              00017820
        ENDDO                                                       00017830
        SBIO       DI20,LIMIT          READ LIMIT SWITCHES          00017840
        IF         (LIMIT,NE,0),GOTO,LIMITERR BEZEL EXCEEDED TRAVEL 00017850
        ENDDO                                                       00017860
        STIMER     200,WAIT            PAUSE AFTER MOVE             00017870
        RETURN                                                      00017880
*   SUBROUTINE TO MOVE REFERENCE EDGE MOTOR #2 IN                   00017890
        SUBROUT    REF2IN                                           00017900
        DO         1,P1=STEP2I                                      00017910
        SBIO       DO22,1              MOVE REFERENCE EDGE #2 IN    00017920
        SBIO       DO22,0                                           00017930
        DO         6                                                00017940
        MOVE       A,B                 WAIT FOR BEZEL TO MOVE       00017950
        MOVE       B,A                                              00017960
        ENDDO                                                       00017970
        SBIO       DI21,LIMIT          READ LIMIT SWITCHES          00017980
        IF         (LIMIT,NE,0),GOTO,LIMITERR BEZEL EXCEEDED TRAVEL 00017990
        ENDDO                                                       00018000
        STIMER     200,WAIT            PAUSE AFTER MOVE             00018010
        RETURN                                                      00018020
*                                                                   00018030
*                                                                   00018040
*   SUBROUTINE TO MOVE REFERENCE EDGE MOTOR #2 OUT                  00018050
*                                                                   00018060
*                                                                   00018070
        SUBROUT    REF2OUT                                          00018080
        DO         1,P1=STEP2O                                      00018090
        SBIO       DO23,1              MOVE REFERENCE EDGE 2 OUT    00018100
        SBIO       DO23,0                                           00018110
        DO         6                                                00018120
        MOVE       A,B                 WAIT FOR BEZEL TO MOVE       00018130
        MOVE       B,A                                              00018140
        ENDDO                                                       00018150
        SBIO       DI21,LIMIT          READ LIMIT SWITCHES          00018160
        IF         (LIMIT,NE,0),GOTO,LIMITERR BEZEL EXCEEDED TRAVEL 00018170
        ENDDO                                                       00018180
        STIMER     200,WAIT            PAUSE AFTER MOVE             00018190
        RETURN                                                      00018200
*   SUBROUTINE TO MOVE REFERENCE EDGE MOTOR #3 IN                   00018210
        SUBROUT    REF3IN                                           00018220
        DO         1,P1=STEP3I                                      00018230
        SBIO       DO24,1              MOVE REFERENCE EDGE 3 IN     00018240
        SBIO       DO24,0                                           00018250
        DO         10                                               00018260
        MOVE       A,B                 WAIT FOR BEZEL TO MOVE       00018270
        MOVE       B,A                                              00018280
        ENDDO                                                       00018290
        SBIO       DI22,LIMIT          READ LIMIT SWITCHES          00018300
        IF         (LIMIT,NE,0),GOTO,LIMITERR BEZEL EXCEEDED TRAVEL 00018310
        ENDDO                                                       00018320
        STIMER     200,WAIT            PAUSE AFTER MOVE             00018330
        RETURN                                                      00018340
*                                                                   00018350
*                                                                   00018360
*   SUBROUTINE TO MOVE REFERENCE EDGE MOTOR #3 OUT                  00018370
*                                                                   00018380
*                                                                   00018390
        SUBROUT    REF3OUT                                          00018400
        DO         1,P1=STEP3O                                      00018410
        SBIO       DO25,1              MOVE REFERENCE EDGE 3 OUT    00018420
        SBIO       DO25,0                                           00018430
        DO         10                                               00018440
        MOVE       A,B                 WAIT FOR BEZEL TO MOVE       00018450
        MOVE       B,A                                              00018460
        ENDDO                                                       00018470
        SBIO       DI22,LIMIT          READ LIMIT SWITCHES          00018480
        IF         (LIMIT,NE,0),GOTO,LIMITERR BEZEL EXCEEDED TRAVEL 00018490
        ENDDO                                                       00018500
        STIMER     200,WAIT            PAUSE AFTER MOVE             00018510
        RETURN                                                      00018520
*   SUBROUTINE - READER                                             00018540
        SUBROUT    READER                                           00018550
```

Assembly Language Listing (Continued)

```
              MOVE        LPCNT,0                 ZERO LOOP COUNT                  00018560
RDLOOP        EQU         *                                                        00018570
              SBIO        DI1,ADREQ               IS ADDR REQ LINE UP?             00018580
              IF          (ADREQ,EQ,1),GOTO,LOADADD   YES, GO LOAD ADDR            00018590
              STIMER      1000,WAIT               WAIT 1 SEC TO TRY AGAIN          00018600
              ADD         LPCNT,1                 ADD 1 TO LOOP COUNT              00018610
              IF          (LPCNT,LT,4),GOTO,RDLOOP                                 00018620
              PRINTEXT    '@ADDRESS REQUEST LINE NOT UP. @'                        00018630

GOTO        EOJ                                                      00018640
LOADADD       EQU         *                                                        00018650
              SBIO        DO1,XADDR                                                00018660
              SBIO        DO2,YADDR                                                00018670
              RESET       PI1                     RESET VIDEO READY PI             00018680
              SBIO        DO4,(PULSE,UP)          SET ADDRESS                      00018690
              WAIT        PI1                     WAIT FOR A/D CONVERT             00018700
              SBIO        DI2,READING             READ VIDEO DATA                  00018710
              SBIO        DO5,(PULSE,UP)          SET VIDEO ACKNOWLEDGE            00018720
              RETURN                                                               00018730

*     SUBROUTINE TO MOVE CAMERA TO HOME POSITION                                   00018750
              SUBROUT     GOHOME                                                   00018760
              MOVE        RCNT,0                  ZERO RAMP COUNT                  00018770
              MOVEA       GOAD,GOAD2              INIT GOTO ADDRESS                00018780
              DO          0,P1=BKSTEPS                                             00018790
              SBIO        DO10,1                  MOVE CAMERA TO LEFT              00018800
              SBIO        DO10,0                                                   00018810
              GOTO        GOAD2,P1=GOAD           RAMP ROUTINE FOR CAMERA MOVE     00018820
GOAD2         ADD         RCNT,1                                                   00018830
              IF          (RCNT,EQ,200)                                            00018840
              MOVEA       GOAD,GOAD1                                               00018850
              ENDIF                                                                00018860
GOAD1         ADD         RCNT,1                                                   00018870
              IF          (RCNT,EQ,300)                                            00018880
              MOVEA       GOAD,GORD                                                00018890
              ENDIF                                                                00018900
GORD          SBIO        DI10,LIMIT              READ LIMIT SWITCHES              00018910
              IF          (LIMIT,EQ,2)            AT HOME EDGE?                    00018920
              MOVE        CODE,1                  SET CODE = 1, HIT HOME EDGE      00018930
              RETURN                                                               00018940
              ENDIF                                                                00018950
              ENDDO                                                                00018960
              MOVE        CODE,-1                 SET GOOD RETURN CODE             00018970
              RETURN                                                               00018980
*     SUBROUTINE TO MOVE CAMERA AWAY FROM HOME POSITON                             00018990
              SUBROUT     GOAWAY                                                   00019000
              MOVE        RCNT,0                  ZERO RAMP COUNT                  00019010
              MOVEA       GWAD,GWAD2              INIT GOTO ADDRESS                00019020
              DO          0,P1=GOSTEPS                                             00019030
              SBIO        DO11,1                  MOVE CAMERA TO RIGHT             00019040
              SBIO        DO11,0                                                   00019050
              GOTO        GWAD2,P1=GWAD           RAMP ROUTINE FOR CAMERA MOVE     00019060
GWAD2         ADD         RCNT,1                                                   00019070
              IF          (RCNT,EQ,200)                                            00019080
              MOVEA       GWAD,GWAD1                                               00019090
              ENDIF                                                                00019100
GWAD1         ADD         RCNT,1                                                   00019110
              IF          (RCNT,EQ,300)                                            00019120
              MOVEA       GWAD,GWRD                                                00019130
              ENDIF                                                                00019140
GWRD          SBIO        DI10,LIMIT              READ LIMIT SWITCHES              00019150
              IF          (LIMIT,EQ,1)            AT RIGHT EDGE?                   00019160
              MOVE        CODE,1                  SET CODE = 1, HIT HOME EDGE      00019170
              RETURN                                                               00019180
              ENDIF                                                                00019190
              ENDDO                                                                00019200
              MOVE        CODE,-1                 SET GOOD RETURN CODE             00019210
              RETURN                                                               00019220
*     CONSTANTS FOR FOCUS PROGRAM                                                  00019240
ADREQ         DATA        F'0'                                                     00019250
LPCNT         DATA        F'0'                                                     00019260
XADDR         DATA        F'0'                                                     00019270
```

Assembly Language Listing (Continued)

```
YADDR     DATA    F'0'                                              00019280
XCONST    DATA    X'1600'                                           00019290
YCONSTL   DATA    X'0E00'                                           00019300
YCONSTC   DATA    X'1600'                                           00019310
YCONSTR   DATA    X'1300'                                           00019320
YCONSTY   DATA    X'1000'                                           00019330
XSAVE     DATA    F'0'                                              00019340
YSAVE     DATA    F'0'                                              00019350
XSAVE1    DATA    F'0'                                              00019360
XSAVE7    DATA    F'0'                                              00019370
STEPOUT   DATA    F'0'                                              00019380
STEPIN    DATA    F'0'                                              00019390
HILEV     DATA    F'0'                                              00019400
FOCSW     DATA    F'0'                                              00019410
READING   DATA    F'0'                                              00019420
PUSH      DATA    8F'0'                                             00019430

REF       DATA    F'0'                                              00019440
REFD      DATA    F'0'                                              00019450
REFF      DATA    F'0'                                              00019460
REFR      DATA    F'0'                                              00019470
LOOPSCAN  DATA    F'0'                                              00019480
TARGET    DATA    F'1'                                              00019490
VALUE     DATA    F'0'                                              00019500
COMP      DATA    F'0'                                              00019510
COMP1     DATA    F'0'                                              00019520
COMP2     DATA    F'0'                                              00019530
COMP3     DATA    F'0'                                              00019540
COMP4     DATA    F'0'                                              00019550
COMP5     DATA    F'0'                                              00019560
COMP6     DATA    F'0'                                              00019570
COMP7     DATA    F'0'                                              00019580
COMP8     DATA    F'0'                                              00019590
COMP9     DATA    F'0'                                              00019600
T1T2STEP  DATA    F'8900'                                           00019610
T2T3STEP  DATA    F'8100'                                           00019620
WORK      DATA    F'0'                                              00019630
YWORK     DATA    F'0'                                              00019640
MTRNUM    DATA    F'1'                                              00019650
SPAD      DATA    2F'0'                                             00019660
FUDGE     DATA    F'407'                                            00019670
PASS      DATA    F'1'                                              00019680
ADLIM     DATA    F'492'                                            00019690
HILIMIT   DATA    X'3500'                                           00019700
LOLIMIT   DATA    X'0500'                                           00019710
SIDLIMIT  DATA    X'1D58'                                           00019720
TOPLIMIT  DATA    X'1600'                                           00019730
SCANEND   DATA    F'0'                                              00019740
SCANLEN   DATA    F'500'                                            00019750
F946      DATA    F'985'                                            00019760
F1000     DATA    F'1000'                                           00019770
RDCOMP    DATA    F'0'                                              00019780
SWITCH    DATA    F'0'                                              00019790
RTNSW     DATA    F'0'                                              00019800
CODE      DATA    F'0'                                              00019810
LOOPCNT   DATA    F'0'                                              00019820
CNT       DATA    F'0'                                              00019830
RCNT      DATA    F'0'                                              00019840
XFOCUS    DATA    F'0'                                              00019850
VINCE     DATA    F'0'                                              00019860
FIRSTSW   DATA    F'0'                                              00019870
DIRECT    DATA    F'0'                                              00019880
DONE      DATA    F'0'                                              00019890
HOME      DATA    F'0'                                              00019900
LIMIT     DATA    F'0'                                              00019910
A         DATA    F'0'                                              00019920
B         DATA    F'0'                                              00019930
XADD1     DATA    F'0'                                              00019940
XADD2     DATA    F'0'                                              00019950
XADD3     DATA    F'0'                                              00019960
XADD4     DATA    F'0'                                              00019970
XADD5     DATA    F'0'                                              00019980
XADD6     DATA    F'0'                                              00019990
XADD7     DATA    F'0'                                              00020000
```

Assembly Language Listing (Continued)

```
XADD8       DATA      F'0'                                              00020010
XADD9       DATA      F'0'                                              00020020
BUFF        BUFFER    256                                               00020030

BUFF1       EQU       BUFF                                              00020040
BUFF2       EQU       BUFF+42                                           00020050
BUFF3       EQU       BUFF+84                                           00020060
BUFF4       EQU       BUFF+126                                          00020070
BUFF5       EQU       BUFF+168                                          00020080
BUFF6       EQU       BUFF+210                                          00020090
BUFF7       EQU       BUFF+252                                          00020100
BUFF8       EQU       BUFF+294                                          00020110
BUFF9       EQU       BUFF+336                                          00020120
BUFW        EQU       BUFF+256                                          00020130
FORE        DATA      C'FORWARD '                                       00020140
BACK        DATA      C'BACKWARD'                                       00020150
FIND        DATA      C'FIND'                                           00020160
SCANT       DATA      C'SCAN'                                           00020170
EDGET       DATA      C'EDGE'                                           00020180
XB          DATA      C'X '                                             00020190
YB          DATA      C'Y '                                             00020200
BLANK       DATA      C' '                                              00020210
ASTER       DATA      C'* '                                             00020220
TGLOW       TEXT      ' '                                               00020230
CHAR        DATA      C'0'                                              00020240
            DATA      C'1'                                              00020250
            DATA      C'2'                                              00020260
            DATA      C'3'                                              00020270
            DATA      C'4'                                              00020280
            DATA      C'5'                                              00020290
            DATA      C'6'                                              00020300
            DATA      C'7'                                              00020310
            DATA      C'8'                                              00020320
            DATA      C'9'                                              00020330
DISTEXT     TEXT      '@DISTANCE = .      INCH@'                        00020340

TEXT        TEXT      '@ X XXXX ROUTINE, TARGET'                        00020350

TEXT2       TEXT      '@2ND CARRIAGE EXCEEDED LIMIT FORWARD @'          00020360

TEXT3       TEXT      '    POS.      T 1       T 2       T 3     T 4C00020370
                          T 5       T 6       T 7       T 8     T 9'  00020380
```

What is claimed is:

1. Apparatus for optimumly adjusting the optical elements of a copier to positions forming images of lines, on an illuminated target background, which have the greatest background-to-line illumination contrast, where the invention comprises:
   an electronic scanner, operable to repeatedly examine the same target line images and generate, for each line, signals manifesting the amount of light reflected by that line relative to the target background; and
   driving devices, for positioning the copier optical elements during repeated operation of the scanner.

2. The apparatus of claim 1, further comprising:
   a circuit for identifying the signals from the scanner representing the greatest light reflection changes caused by scanning across a line width, thereby indicating as output signals the sharpest image of the scanned line during each scan.

3. The apparatus of claim 2, further comprising:
   an additional circuit for repositioning the copier optical elements after operation of the scanner as a statistical function of the sharpest images indicated for all scans.

4. The apparatus of claims 2 or 3, further comprising:
   means for adjusting the relative positions of the target lines and the scanner.

5. The apparatus of claims 2, 3, or 4, further comprising:
   means for adjusting the scanner position to examine different lines.

6. The apparatus of claims 1, 2, 3, 4 or 5, wherein a position detector indicates the presence of a line during operation of the scanner.

7. A combination permitting the automatic adjustment of those elements of a copier affecting optical alignment and focus, comprising:
   an illuminated target carrying lines located in different areas;
   scanning means, operable to scan in steps across target lines in one target area at a time, and generate output signals during scanning of each line;
   light level detection means, operable during scanning of each target area, to generate light level value signals indicating the light level value represented by each of the output signals from the scanning means;

interpretation means, operable by the light level value signals to generate line light level value signals; and recognition means, operable by the line light level value signals, to indicate the position of one line at a time.

8. The combination of claim 7, further comprising:

first adjustment circuits, operable when a line position is indicated, for adjusting the copier elements to give different degrees of focus for each scan step.

9. The combination of claim 8, further comprising:

recording means, operable by the line light level value signals to record line light level values for each scan step in each target area; and selection means, operable by the interpretation and recording means, to select the smallest line light level value for each area.

10. The combination of claim 9, further comprising:

second adjustment circuits for readjusting the copier elements to that "best" degree of focus which corresponds to the average of the smallest line light level values.

11. The combination of claim 10, wherein the second adjustment circuits further comprise means for maintaining aforesaid "best" degree of focus through varying optical magnification ratios.

12. Optical apparatus, including a light source, adjustable to illuminate a target and form an adjustably focused image of the target as a function of the relative physical positions of the source, and intervening optical elements, wherein the invention comprises:

a receptor, operable to receive the illuminated target image, examine sections of the image in sequence for illumination changes and supply, at an output, signals representing the illumination changes;

motive devices connected to selected ones of the aforesaid devices for receiving controlling signals; and control means, connected to said motive devices, operable to supply controlling signals which position the receptor relative to one selector target section after another and, for each position, adjust the positions of selected ones of the source and optical elements to vary the image focus.

13. The apparatus of claim 12, further including:

additional control means, connected to the receptor, for receiving illumination changes indicating the target positions at which signals representing selected illumination changes occur.

14. The apparatus of claim 13, further including:

additional control means, operable to reposition selected ones of the source and optical elements in accordance with the average of the selected illumination changes.

15. The additional control means of claim 14, wherein the source and optical elements are adjusted for a number of magnifications.

16. An optical alignment system for a copier, including:

an adjustable document carrier, capable of being illuminated, carrying a test pattern of lines in a contrasting background;

a plurality of separately adjustable reflectors and lenses for focusing an optical image of the test pattern at an image plane;

an electronic scanner, for receiving an optical input of the image focused at the image plane, and electrical inputs and outputs, for supplying to the outputs digital signals representing the light contrast between the lines and the background, in different areas of the image plane, sequentially selected in accordance with digital signals supplied to its inputs;

a plurality of drive devices, connected to the reflectors, lenses and scanner, operable in accordance with drive signals to separately adjust the physical positions of selected ones of the foregoing;

drive control means, having drive outputs connected to supply drive signals to the drive devices, in accordance with control signals from the scanner; and logic means, connected to the scanner and drive control means, for supplying digital signals to cause the scanner to be adjusted to scan across the lines in different areas of the test pattern, and recording digital signals from the scanner output as selected drive devices are driven by signals at the drive outputs to adjust the physical positions of the reflectors and lenses.

17. The system of claim 16, further including:

control means, connected to the logic means, for adjusting the physical positions of the reflectors and lenses to positions corresponding to a function of the recorded digital signals representing the highest light contrasts in all the areas.

18. An optical element alignment focusing apparatus, including:

a target, providing a reference for alignment and focusing;

a light source, associated with the target and the optical elements, for illuminating the target and forming an image of the target in an image plane as a function of the relative physical positions of the source and the optical elements;

an image receptor, located at the image plane, operable to receive the optical image, examine points of the image in a selected sequence and supply, at an output, signals representing light-to-dark-to-light transitions at the points examined;

a plurality of motive devices connected to selected ones of the light source, optical elements and receptor, having inputs for receiving signals for controlling the positions of the connected means;

first control means, connected to the inputs of said motive devices, operable to supply at outputs signals which position the receptor relative to one selected point on the target after another and, for each point, reposition selected ones of the optical elements;

second control means, having an input connected to the image receptor output, for receiving light-to-dark-to-light transition signals and indicating as signals, at an output, the target positions causing said signals and the target positions causing the signals representing the largest light-to-dark-to-light transitions; and third control means, having an input connected to the second control means input and outputs connected to selected motive devices operable to reposition optical elements in accordance with the average of the largest transitions indicated by signals at the second control means output.

19. The apparatus of claim 18, wherein there are further provided:

fourth control means, connected to aforesaid elements, operable to reposition selected ones of the optical elements to produce an image of the target smaller than the target and to cause the third control means to reposition selected others of the optical elements to maintain the focus achieved by the third control means.

20. The apparatus of claim 19, wherein the fourth control means causes the image receptor to examine two successive points and cause the third control means to adjust selected optical elements to give an apparent spacing between the elements determined by the actual spacing of the points on the target and the amount of image reduction.

21. Apparatus for automatically aligning a copier optical assembly prior to normal operation, including:

a light source, normally operable to scan light across documents to be copied;

an adjustable document carrier, capable of illumination by the light source, normally supporting, on one surface, documents to be copied, carrying a test pattern of lines on said surface;

an optical image plane, defining the plane in which an image of the document or test pattern on the carrier surface is focused, said plane being on a photoconductor surface during normal operation;

a plurality of separately adjustable reflectors and lenses, interposed in a path extending from the light source, to the carrier surface and then to the image plane, for controlling the illumination of said surface and focusing the illuminated image at the image plane;

an electronic scanner, having an optical input focused at image plane points, and electrical inputs and outputs, for supplying to the outputs digitally encoded electrical signals having values representing the light values and positions of lines at points, in the image plane, sequentially selected in accordance with digitally encoded electrical signals supplied to its electrical inputs;

a plurality of drive devices, connected to the document carrier, reflectors, lenses and scanner, operable in accordance with drive signals to separately adjust the physical positions of aforesaid carrier, reflectors, lenses and scanner;

control means, having control inputs and control outputs, and having drive outputs connected to supply drive signals to the drive devices;

logic means, having inputs and outputs connected to the control means control outputs and inputs, respectively, including:

first means for supplying digitally encoded signals at its outputs for causing the physical position of the scanner to be adjusted to different points on the image plane and receive at its inputs digital signals from the scanner representing the light values and positions of lines at said points;

second means for adjusting selected drive devices to adjust the physical positions of the carrier, reflectors and lenses;

third means for electrically recording said digital signals from said scanner as said second means adjusts the drive devices; and fourth means for returning the physical positions of the carrier, reflectors and lenses to the positions corresponding to the recorded digital signal representing the average of the lowest light values for each scanner position.

22. The apparatus of claim 21, wherein selected ones of the reflectors and lenses are adjusted to give a desired image reduction and the fourth means adjusts selected ones thereof in accordance with the difference in the positions indicated for selected lines relative to their actual position of the lines on the target.

23. A method of aligning the optical elements of a document copier and adjusting them for the best focus of an image of an illuminated series of lines retained in a place normally occupied by a document, including the steps of:

scanning at least one line repeatedly to generate signals encoded to represent values related to the light reflected from the line;

adjusting the copier elements to change the image focus for each scan; and comparing successive values and generating additional signals encoded to represent values equivalent to the sharpness of the image of the line for each scan.

24. The method of claim 23, further including the step of:

recording, for each scan, the line values and the associated optical elements' adjustments.

25. The method of claims 23 or 24, further including the step of:

examining different lines, one at a time.

26. The method of claims 23, 24 or 25, further including the steps of:

selecting the lowest light value for each line image;

generating further signals encoded to represent values equivalent to the average of the corresponding digital values; and adjusting the optical elements as a function of the signals representing aforesaid average.

27. The method of claims 23, 24, 25 or 26, further including the step of:

adjusting the place where the lines are retained as a function of the line light values.

28. A method of aligning the optical elements of a document copier and adjusting them for best focus, including the steps of:

retaining a test pattern in a place normally occupied by a document;

illuminating the test pattern a section at a time;

examining different areas of the test pattern, one area at a time;

scanning each test pattern area point-by-point to generate digitally encoded signals representing values related to the amounts of light reflected from the pattern at the scanned points;

detecting the presence of a pattern element;

generating, for pattern elements, additional digitally encoded signals representing additional digital values related to the light reflected from adjacent scanned points;

selecting, for each area, the smallest additional digital value and generating further digitally encoded signals representing further digital values equivalent to the average of the smallest digital values;

adjusting the optical elements as a function of the signals representing the further digital values; and adjusting the place where the test pattern is retained as a function of the signals representing the further digital values.

* * * * *